(12) United States Patent
Lee et al.

(10) Patent No.: US 11,432,265 B2
(45) Date of Patent: Aug. 30, 2022

(54) METHOD AND DEVICE FOR ADJUSTING TRANSMISSION PARAMETER BY SIDELINK TERMINAL IN NR V2X

(71) Applicant: LG ELECTRONICS INC., Seoul (KR)

(72) Inventors: Jongyoul Lee, Seoul (KR); Hanbyul Seo, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 11 days.

(21) Appl. No.: 16/964,810

(22) PCT Filed: May 8, 2019

(86) PCT No.: PCT/KR2019/005458
§ 371 (c)(1),
(2) Date: Jul. 24, 2020

(87) PCT Pub. No.: WO2019/216627
PCT Pub. Date: Nov. 14, 2019

(65) Prior Publication Data
US 2021/0058899 A1 Feb. 25, 2021

Related U.S. Application Data

(60) Provisional application No. 62/668,827, filed on May 9, 2018.

(51) Int. Cl.
*H04W 72/02* (2009.01)
*H04B 17/318* (2015.01)
*H04W 4/40* (2018.01)
*H04L 1/00* (2006.01)
(Continued)

(52) U.S. Cl.
CPC .......... *H04W 72/02* (2013.01); *H04B 17/318* (2015.01); *H04L 1/0003* (2013.01);
(Continued)

(58) Field of Classification Search
CPC ....... H04W 72/02; H04W 4/40; H04W 24/10; H04W 72/0473; H04W 92/18; H04B 17/318; H04L 1/0003
See application file for complete search history.

(56) References Cited

U.S. PATENT DOCUMENTS 10,098,014 B1 * 10/2018 Shimizu ............... H04B 7/0617
2010/0099429 A1 * 4/2010 Ishii .................. H04W 72/1268
455/452.1

(Continued)

FOREIGN PATENT DOCUMENTS

WO 2017142377 A1 8/2017

OTHER PUBLICATIONS

Huawei et al., "On UE Antenna model in eV2X Evaluation Methodology", 3GPP TSG RAN WG1 Meeting #92bis, Sanya, China, Apr. 16-20, 2018, R1-1804299 (Year: 2018).*
(Continued)

*Primary Examiner* — Joseph A Bednash
(74) *Attorney, Agent, or Firm* — Dentons US LLP

(57) ABSTRACT

Provided are a method for performing sidelink transmission by a transmission terminal in a wireless communication system, and a device supporting same. The method can comprise the steps of: adjusting a parameter associated with sidelink transmission on the basis of the height of an antenna of a transmission terminal; and performing sidelink transmission for a reception terminal on the basis of the adjusted parameter.

14 Claims, 27 Drawing Sheets

(51) Int. Cl.
*H04W 24/10* (2009.01)
*H04W 72/04* (2009.01)
*H04W 92/18* (2009.01)

(52) U.S. Cl.
CPC ............ *H04W 4/40* (2018.02); *H04W 24/10* (2013.01); *H04W 72/0473* (2013.01); *H04W 92/18* (2013.01)

(56) References Cited

U.S. PATENT DOCUMENTS

| | | | |
|---|---|---|---|
| 2014/0329520 A1* | 11/2014 | Militano | H04W 24/08 455/422.1 |
| 2015/0049736 A1* | 2/2015 | Liu | H04W 72/04 370/331 |
| 2016/0128000 A1* | 5/2016 | Furuichi | H04W 52/362 370/329 |
| 2017/0285177 A1 | 10/2017 | Jin et al. | |
| 2017/0289934 A1 | 10/2017 | Sheng et al. | |
| 2018/0049073 A1 | 2/2018 | Dinan et al. | |
| 2018/0124650 A1 | 5/2018 | Park et al. | |
| 2018/0343096 A1* | 11/2018 | Kim | H04W 16/28 |
| 2020/0068609 A1* | 2/2020 | Wang | H04W 72/0446 |

OTHER PUBLICATIONS

3rd Generation Partnership Project; Technical Specification Group Radio Access Network; Evolved Universal Terrestrial Radio Access (E-UTRA); Physical layer procedures (Release 15), 3GPP TS 36.213, V15.1.0 (Mar. 2018).

\* cited by examiner

100

Self-driving device

260

HEIGHT DIRECTION(H)

WIDTH DIRECTION(L)

OVERALL-LENGTH DIRECTION(L)

(a)

(b)

(a)

(b)

METHOD AND DEVICE FOR ADJUSTING TRANSMISSION PARAMETER BY SIDELINK TERMINAL IN NR V2X

CROSS-REFERENCE TO RELATED APPLICATIONS

This application is the National Stage filing under 35 U.S.C. 371 of International Application No. PCT/KR2019/005458, filed on May 8, 2019, which claims the benefit of U.S. Provisional Application No. 62/668,827 filed on May 9, 2018, the contents of which are all hereby incorporated by reference herein in their entirety.

BACKGROUND OF THE DISCLOSURE

Field of the Disclosure

The present disclosure relates to a wireless communication system.

Related Art

A wireless communication system is a multiple access system that supports communication of multiple users by sharing available system resources (e.g., a bandwidth, transmission power, and so on) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

FIG. 1 shows examples of 5G usage scenarios to which the technical features of the present disclosure can be applied. The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km². mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V21), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Objects

Meanwhile, when considering a propagation characteristic, a propagation coverage may vary in accordance with an antenna height. For example, when it is assumed that a same transmission power is used, a propagation being propagated from a high antenna may have a larger coverage than a propagation being propagated from a low antenna. Therefore, in sidelink communication, a vehicle corresponding to a low antenna may receive interference from a vehicle corresponding to high antenna. Therefore, considering the antenna height and the vehicle size, a method for adjusting/determining, by a transmitting UE, a transmission parameter needs to be proposed.

Technical Solutions

According to an embodiment, provided herein is a method for performing, by a transmitting user equipment (UE), sidelink transmission in a wireless communication system. The method may include the steps of adjusting a parameter related to sidelink transmission based on an antenna height of the transmitting UE, and performing sidelink transmission for a receiving UE based on the adjusted parameter.

According to another embodiment, provided herein is a method for transmitting, by a base station, a parameter related to an antenna height of a user equipment (UE) in a wireless communication system. The method may include the steps of transmitting, to the UE, a parameter related to an antenna height of the UE, wherein the parameter may be at least one of a transmission power for sidelink transmission, a Modulation and Coding Scheme (MCS) for sidelink transmission, a threshold value being used during a sensing operation for sidelink resource selection, or a range for a horizontal angle or vertical angle of an antenna for sidelink transmission.

According to another embodiment, provided herein is a processor for a transmitting user equipment (UE). The processor may be configured to control the UE so that the UE can perform a step of adjusting a parameter related to sidelink transmission based on an antenna height of the transmitting UE, and a step of performing sidelink transmission for a receiving UE based on the adjusted parameter.

Effects of the Disclosure

The user equipment (UE) may efficiently perform communication.

DESCRIPTION OF EXEMPLARY EMBODIMENTS

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Hereinafter, a vehicle to which the exemplary embodiment of the present disclosure can be applied will be described in detail.

Figure 1:
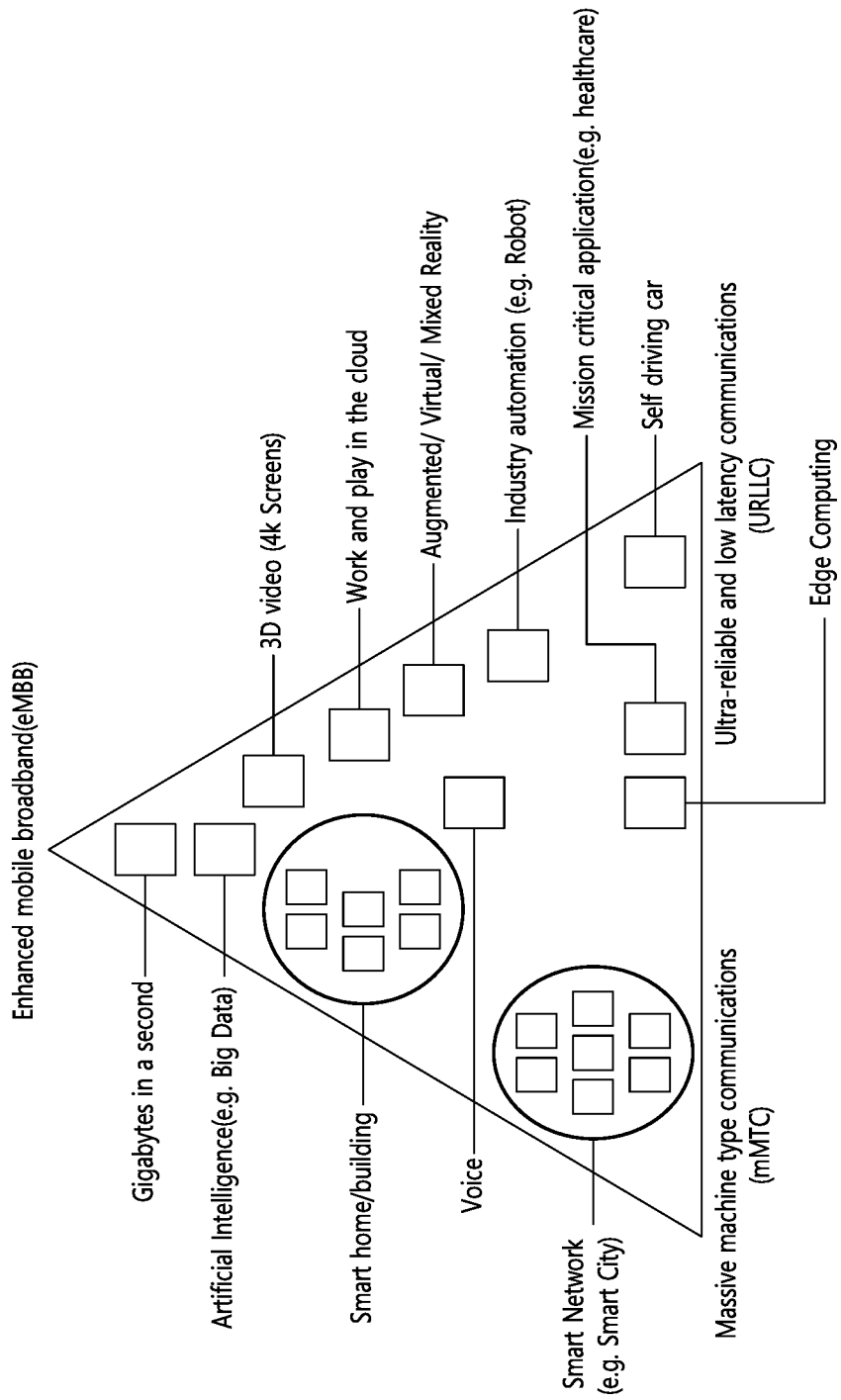
FIG. 1 shows examples of 5G usage scenarios to which the technical features of the present disclosure can be applied.
Figure 2:
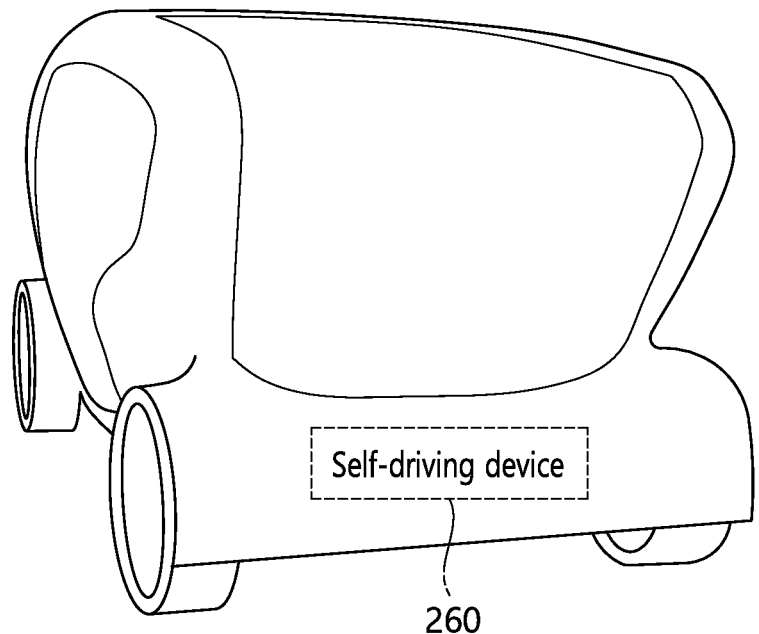
FIG. 2 shows a vehicle to which an exemplary embodiment of the present disclosure can be applied.
Figure 2:
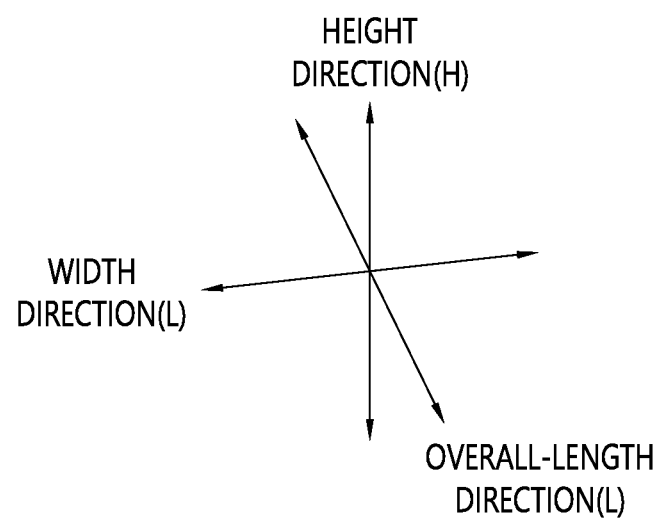

FIG. 2 shows a vehicle to which an exemplary embodiment of the present disclosure can be applied.

Referring to FIG. 2, a vehicle (100) to which the present disclosure can be applied is defined as a transport means that runs (or drives) on a road or rail. The vehicle (100) may be a concept including automobiles, trains, and motorcycles. The vehicle (100) may be a concept that includes all of an internal combustion engine (ICE) vehicle being equipped with an engine as its power source, a hybrid vehicle being equipped with an engine and an electric motor as its power source, an electric vehicle being equipped with an electric motor as its power source, and so on. The vehicle (100) may be a personally owned vehicle (POV). The vehicle (100) may also correspond to a shared vehicle. And, the vehicle (100) may be an autonomous (or self-driving) vehicle.

Figure 3:
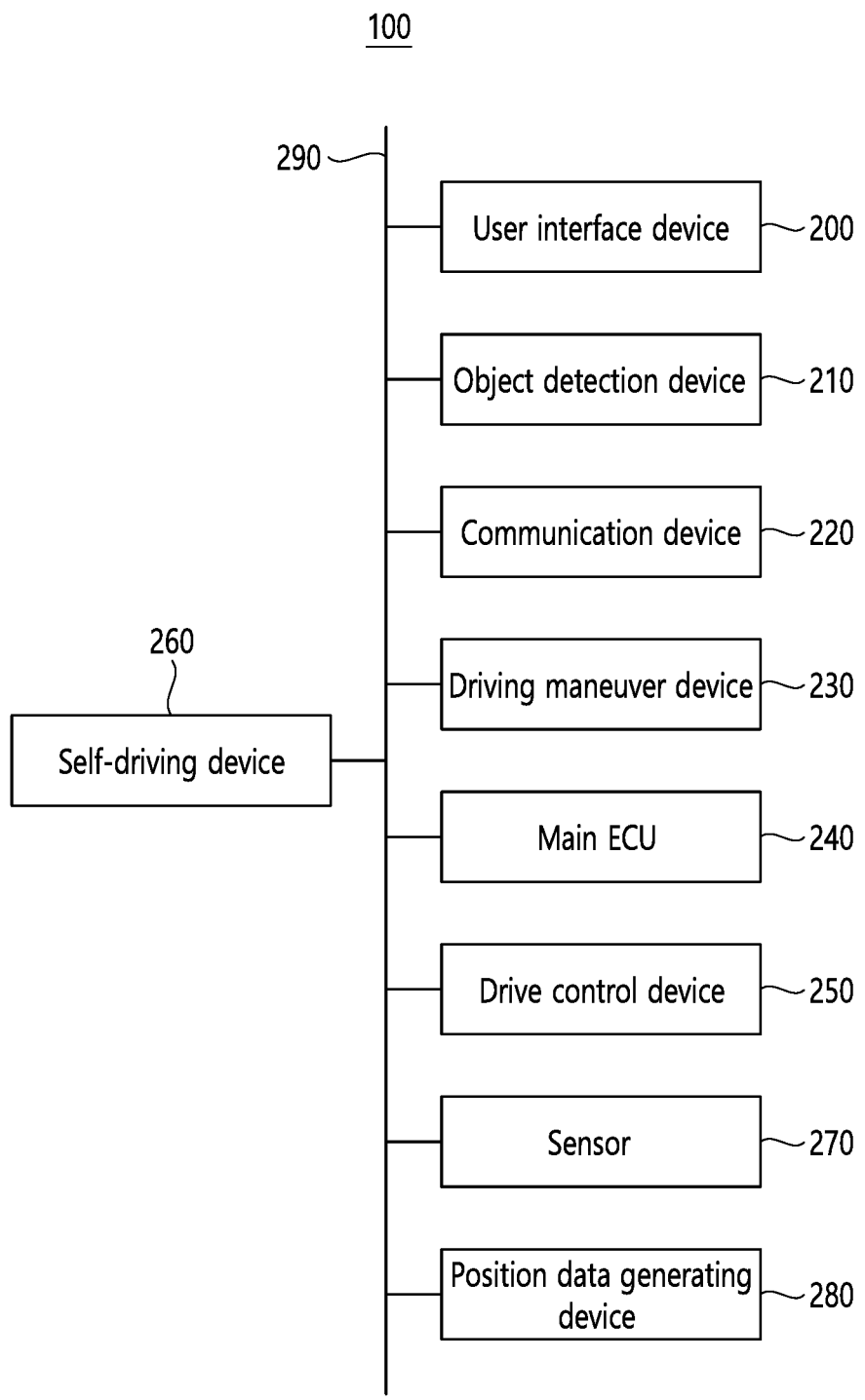
FIG. 3 shows a control block diagram of a vehicle according to an exemplary embodiment of the present disclosure.

FIG. 3 shows a control block diagram of a vehicle according to an exemplary embodiment of the present disclosure.

Referring to FIG. 3, the vehicle (100) may include a user interface device (200), an object detection device (210), a communication device (220), a driving maneuver device (230), a main ECU (240), a drive control device (250), a self-driving device (260), a sensor (270), and a position data generating device (280). The object detection device (210), the communication device (220), the driving maneuver device (230), the main ECU (240), the drive control device (250), the self-driving device (260), the sensor (270), and the position data generating device (280) may each generate an electrical signal and may collectively embody an electrical device exchanging electrical signals between each block.

1) User Interface Device

The user interface device (200) is a device being configured for a communication between the vehicle (100) and the user. The user interface device (200) may receive user input and may provide information generated from the vehicle (100) to the user. The vehicle (100) may implement a User Interface (UI) or User Experience (UX) via the user interface device (200). The user interface device (200) may include an input device, an output device, and a user monitoring device.

2) Object Detection Device

The object detection device (210) may generate information on an object being positioned outside of the vehicle (100). The information on an object may include at least one of information on the presence or absence of an object, position information of the object, information on a distance between the vehicle (100) and the object, and information on a relative velocity between the vehicle (100) and the object. The object detection device (210) may detect an object being positioned outside of the vehicle (100). The object detection device (210) may include at least one sensor capable of detecting an object being positioned outside of the vehicle (100). The object detection device (210) may include at least one of a camera, a radar, a lidar, an ultrasonic sensor, and an infrared sensor. The object detection device (210) may provide the object-related data generated based on a sensing signal, which is generated from a sensor, to at least one of the electronic devices included in the vehicle.

2.1) Camera

The camera may generate information on an object being positioned outside of the vehicle (100) by using an image. The camera may include at least one lens, at least one image sensor, and at least one processor being electrically connected to the at least one image sensor so as to process received signals and generating data related to the object based on the processed signals.

The camera may be at least one of a mono camera, a stereo camera, and an Around View Monitoring (AVM) camera. The camera may obtain position information of an object, information on a distance between the camera and the object or information on a relative velocity between the camera and the object, by using various image processing algorithms. For example, the camera may obtain the information on the distance and relative velocity between the camera and the object, from the obtained image, based on a change in object size in accordance with time. For example, the camera may obtain the information on the distance and relative velocity between the camera and the object via pinhole model, road profiling, and so on. For example, the camera may obtain the information on the distance and relative velocity between the camera and the object from a stereo image, which is obtained from the stereo camera, based on disparity information.

In order to capture the exterior of the vehicle, the camera may be mounted at a position of the vehicle from which a field of view (FOV) can be ensured. In order to capture a front area of the vehicle, the camera may be installed near a front windshield inside the vehicle. The camera may be installed near a front bumper or radiator grill. In order to capture a back area of the vehicle, the camera may be installed near a rear glass inside the vehicle. The camera may be installed near a rear bumper, a trunk, or tail gate. In order to capture a side area of the vehicle, the camera may be installed near at least one side window inside the vehicle. Alternatively, the camera may be installed near a side mirror, a fender, or a door.

2.2) Radar

The radar may generate information on an object being positioned outside of the vehicle (100) by using radio waves. The radar may include a radio wave transmitter, a radio wave receiver, and at least one processor being electrically connected to the radio wave transmitter and the radio wave receiver so as to process received signals and generating data on the object based on the processed signals. The radar may be implemented as a pulse radar or a continuous-wave radar. Herein, the continuous-wave radar may be implemented as a Frequency Modulated Continuous Wave (FMCW) radar or a Frequency Shift Keying (FSK) radar. The radar may detect an object based on a Time of Flight (TOF) method or a phase-shift method by using radio waves and may then detect a position of the detected object, and a distance and relative velocity between the radar and the detected object. The radar may be adequately installed on the outside of the vehicle in order to detect an object, which is positioned in front of the vehicle, behind the vehicle, or at the side of the vehicle.

2.3) Lidar

The lidar may generate information on an object being positioned outside of the vehicle (100) by using laser light. The lidar may include a light transmitter, a light receiver, and at least one processor being electrically connected to the light transmitter and the light receiver so as to process received signals and generating data on the object based on the processed signals. The lidar may be implemented by using a Time of Flight (TOF) method or a phase-shift method. The lidar may be implemented as an operational lidar or a non-operational lidar. In case the lidar is implemented as the operational type, the lidar is rotated by a motor and may detect any object in the surroundings of the vehicle (100). In case the lidar is implemented as the non-operational type, the lidar may detect objects being located within a predetermined range from the vehicle (100) via optical steering. The vehicle (100) may include a plurality of non-operational lidars. The lidar may detect an object based on a Time of Flight (TOF) method or a phase-shift method by using laser light and may then detect a position of the detected object, and a distance and relative velocity between the lidar and the detected object. The lidar may be adequately installed on the outside of the vehicle in order to detect an object, which is positioned in front of the vehicle, behind the vehicle, or at the side of the vehicle.

3) Communication Device

The communication device (220) may wirelessly exchange signals with a device located outside of the vehicle (100). The communication device (220) may exchange signals with an external device through a network or may directly exchange signals with an external device. An external device may include at least one of a server, a mobile equipment (or device), and another vehicle. For example, the communication device (220) may exchange signals with at least one user equipment (UE). In order to perform communication, the communication device (220) may include at least one of a radio frequency (RF) circuit and an RF device that can implement at least one communication protocol. According to the exemplary embodiment of the present disclosure, the communication device (220) may also use a plurality of communication protocols. The communication device (220) may shift communication protocols in accordance with its distance from a mobile equipment.

For example, the communication device may exchange signals with an external device based on a Cellular V2X (C-V2X) technology. For example, the C-V2X technology may include an LTE-based sidelink communication and/or an NR-based sidelink communication. Details on the C-V2X will be described later on.

For example, the communication device may exchange signals with an external device based on an IEEE 802.11p PHY/MAC layer technology and IEEE 1609 Network/Transport layer technology based Dedicated Short Range Communications (DSRC) technology or Wireless Access in Vehicular Environment (WAVE) specification. The DSRC (or WAVE specification) technology is a communication standard that has been devised to provide Intelligent Transport System (ITS) services via short range dedicated communication between on-board units or between a roadside unit and an on-board unit. The DSRC technology may use a 5.9 GHz band frequency and may perform communication having a data transmission rate of 3 Mbps-27 Mbps. The IEEE 802.11p technology may be combined with the IEEE 1609 technology so as to support the DSRC technology (or WAVE specification).

The communication device according to the present disclosure may exchange signals with an external device by using only any one of the C-V2X technology and the DSRC technology. Alternatively, the communication device according to the present disclosure may exchange signals with an external device by using a hybrid technology consisting of the C-V2X technology and the DSRC technology.

4) Driving Maneuver Device

The driving maneuver device (230) is a device receiving user input for driving. In case of a manual mode, the vehicle (100) may be operated based on signals being provided by the driving maneuver device (230). The driving maneuver device (230) may include a steering input device (e.g., steering wheel), an acceleration input device (e.g., accelerator pedal), and a brake input device (e.g., brake pedal).

5) Main ECU

The main ECU (240) may control overall operations of at least one electronic device being equipped in the vehicle (100).

6) Drive Control Device

The drive control device (250) is a device being configured to electrically control diverse types of vehicle driving devices within the vehicle (100). The drive control device (250) may include a powertrain drive control device, a chassis drive control device, a door/window drive control device, a safety unit drive control device, a lamp drive control unit, and a duct drive control device. The powertrain drive control device may include a power source drive control device and a transmission drive control device. The chassis drive control device may include a steering drive control device, a brake drive control device, and a suspension drive control device. The safety unit drive control device may include a safety belt (or seat belt) drive control device for controlling safety belts (or seat belts).

The drive control device (250) includes at least one electronic control device (e.g., Electronic Control Unit (ECU)).

The drive control device (250) may control the vehicle driving devices based on the signals received from the self-driving device (260). For example, the drive control device (250) may control the powertrain, the steering device, and the brake device based on the signals received from the self-driving device (260).

7) Self-Driving Device

The self-driving device (260) may generate a path for self-driving based on the acquired data. The self-driving device (260) may generate a driving plan in accordance with the generated path. The self-driving device (260) may generate a signal for controlling movements of the vehicle (100) according the driving place. The self-driving device (260) may provide the generated signals to the drive control device (250).

The self-driving device (260) may implement at least one Advanced Driver Assistance System (ADAS) function. The ADAS may implement at least one of an Adaptive Cruise Control (ACC) system, an Autonomous Emergency Braking (AEB) system, a Forward Collision Warning (FCW) system, a Lane Keeping Assist (LKA) system, a Lane Change Assist (LCA) system, a Target Following Assist (TFA) system, a Blind Spot Detection (BSD) system, an adaptive High Beam Assist (HBA) system, an Auto Parking System (APS), a pedestrian (PD) collision warning system, a Traffic Sign Recognition (TSR) system, a Traffic Sign Assist (TSA) system, a Night Vision (NV) system, a Driver Status Monitoring (DSM) system, and a Traffic Jam Assist (TJA) system.

The self-driving device (260) may perform a shifting operation from the self-driving mode to the manual driving mode or a shifting operation from the manual driving mode or the self-driving mode. For example, the self-driving device (260) may shift the driving mode of the vehicle (100) from the self-driving mode to the manual mode or from the manual mode to the self-driving mode based on the signals received from the user interface device (200).

8) Sensor

The sensor (270) may sense the vehicle status. The sensor (270) may include at least one of an inertial measurement unit (IMU) sensor, a collision sensor, a wheel sensor, a speed sensor, an inclination sensor, a weight detection sensor, a heading sensor, a position module, a vehicle forward/reverse sensor, a battery sensor, a fuel sensor, a tire sensor, a steering sensor, a temperature sensor, a humidity sensor, an ultrasonic sensor, an illuminance sensor, and a pedal position sensor. Meanwhile, the inertial measurement unit (IMU) sensor may include one or more of an acceleration sensor, a gyro sensor, and a magnetic sensor.

The sensor (270) may generate the vehicle status data based on the signals generated from at least one of the sensors. The vehicle status data may be information being generated based on the data detected from diverse sensors equipped in the vehicle. The sensor (270) may generate data, such as vehicle stability data, vehicle motion data, vehicle yaw data, vehicle roll data, vehicle pitch data, vehicle collision data, vehicle direction data, vehicle angle data, vehicle speed data, vehicle acceleration data, vehicle inclination data, vehicle forward/reverse data, vehicle weight data, battery data, fuel data, tire air pressure data, vehicle indoor temperature data, vehicle indoor humidity data, steering wheel rotation angle data, vehicle outdoor illuminance data, data on pressure applied to the acceleration pedal, data on pressure applied to the brake pedal, and so on.

9) Position Data Generating Device

The position data generating device (280) may generate position data of the vehicle (100). The position data generating device (280) may include at least one of a Global Positioning System (GPS) and a Differential Global Positioning System (DGPS). The position data generating device (280) may generate the position data of the vehicle (100)

based on signals being generated from at least one of the GPS and the DGPS. According to an exemplary embodiment of the present disclosure, the position data generating device (280) may calibrate the position data based on at least one of the Inertial Measurement Unit (IMU) of the sensor (270) and the camera of the object detection device (210). The position data generating device (280) may be referred to as a Global Navigation Satellite System (GNSS).

The vehicle (100) may include an internal communication system (290). A plurality of electronic devices being included in the vehicle (100) may exchange signals between one another by using the internal communication system (290). Data may be included in the corresponding signals. The internal communication system (290) may use at least one communication protocol (e.g., CAN, LIN, FlexRay, MOST, Ethernet).

Figure 4:
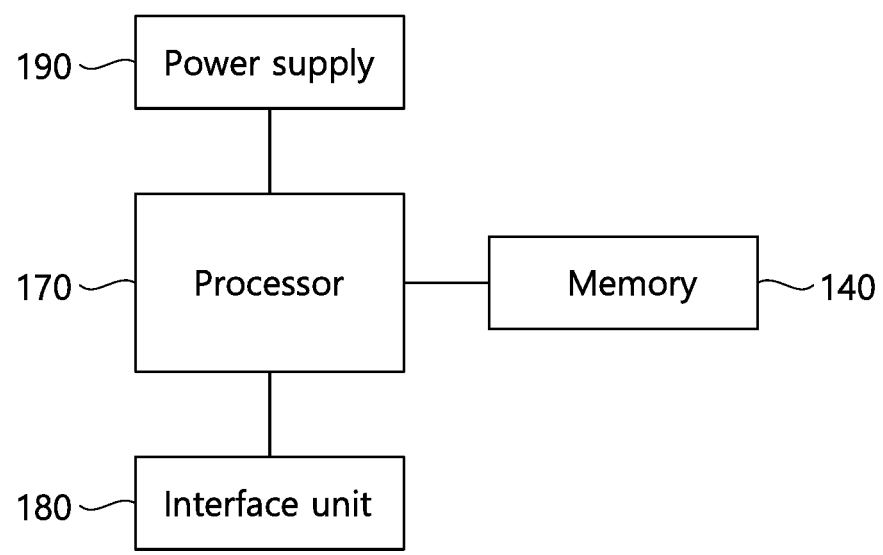
FIG. 4 shows a control block diagram of a self-driving device to which the exemplary embodiment of the present disclosure can be applied.

FIG. 4 shows a control block diagram of a self-driving device to which the exemplary embodiment of the present disclosure can be applied.

Referring to FIG. 4, the self-driving device (260) may include a memory (140), a processor (170), an interface unit (180), and a power supply (190).

The memory (140) is electrically connected to the processor (170). The memory (140) may store basic (or primary) data on a unit, control data for controlling operations of a unit, and data being inputted and outputted. The memory (140) may be configured in the form of hardware as at least one of ROM, RAM, EPROM, flash drive, and hard drive. The memory (140) may store diverse data for the overall operations of the self-driving device (260), such as programs for processing or controlling the processor (170). The memory (140) may be implemented as a single body with the processor (170). According to the exemplary embodiment of the present disclosure, the memory (140) may be classified as a sub-structure of the processor (170).

The interface unit (180) may exchange signals with at least one electronic device being equipped in the vehicle (100) via wired or wireless connection. The interface unit (180) may exchange signals with at least one of the object detection device (210), the communication device (220), the driving maneuver device (230), the main ECU (240), the drive control device (250), the sensor (270), and the position data generating device (280) via wired or wireless connection. The interface unit (180) may be configured of any one of a communication module, a terminal, a pin, a cable, a port, a circuit, an element, and a device.

The power supply (190) may supply power to the self-driving device (260). The power supply (190) may be supplied with power from a power source (e.g., battery), which is included in the vehicle (100), and the power may then be supplied to each unit of the self-driving device (260). The power supply (190) may be operated in accordance with a control signal, which is provided by the main ECU (240). The power supply (190) may include a switched-mode power supply (SMPS).

The processor (170) may be electrically connected to the memory (140), the interface unit (180), and the power supply (190) and may exchange signals to and from one another. The processor (170) may be implemented by using at least one of application specific integrated circuits (ASICs), digital signal processors (DSPs), digital signal processing devices (DSPDs), programmable logic devices (PLDs), field programmable gate arrays (FPGAs), processors (FPGAs), controllers, micro-controllers, microprocessors, and electric units performing many other functions.

The processor (170) may be operated by power provided from the power supply (190). The processor (170) may receive data while being provided with power from the power supply (190), process data, generate signals, and provide the generated signals.

The processor (170) may receive information from another electronic device equipped in the vehicle (100) via the interface unit (180). The processor (170) may provide control signals to another electronic device equipped in the vehicle (100) via the interface unit (180).

The self-driving device (260) may include at least one printed circuit board (PCB). The memory (140), the interface unit (180), the power supply (190), and the processor (170) may be electrically connected to the printed circuit board (PCB).

Hereinafter, a communication technology to which an exemplary embodiment of the present disclosure is to be applied will be described in detail.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 5:
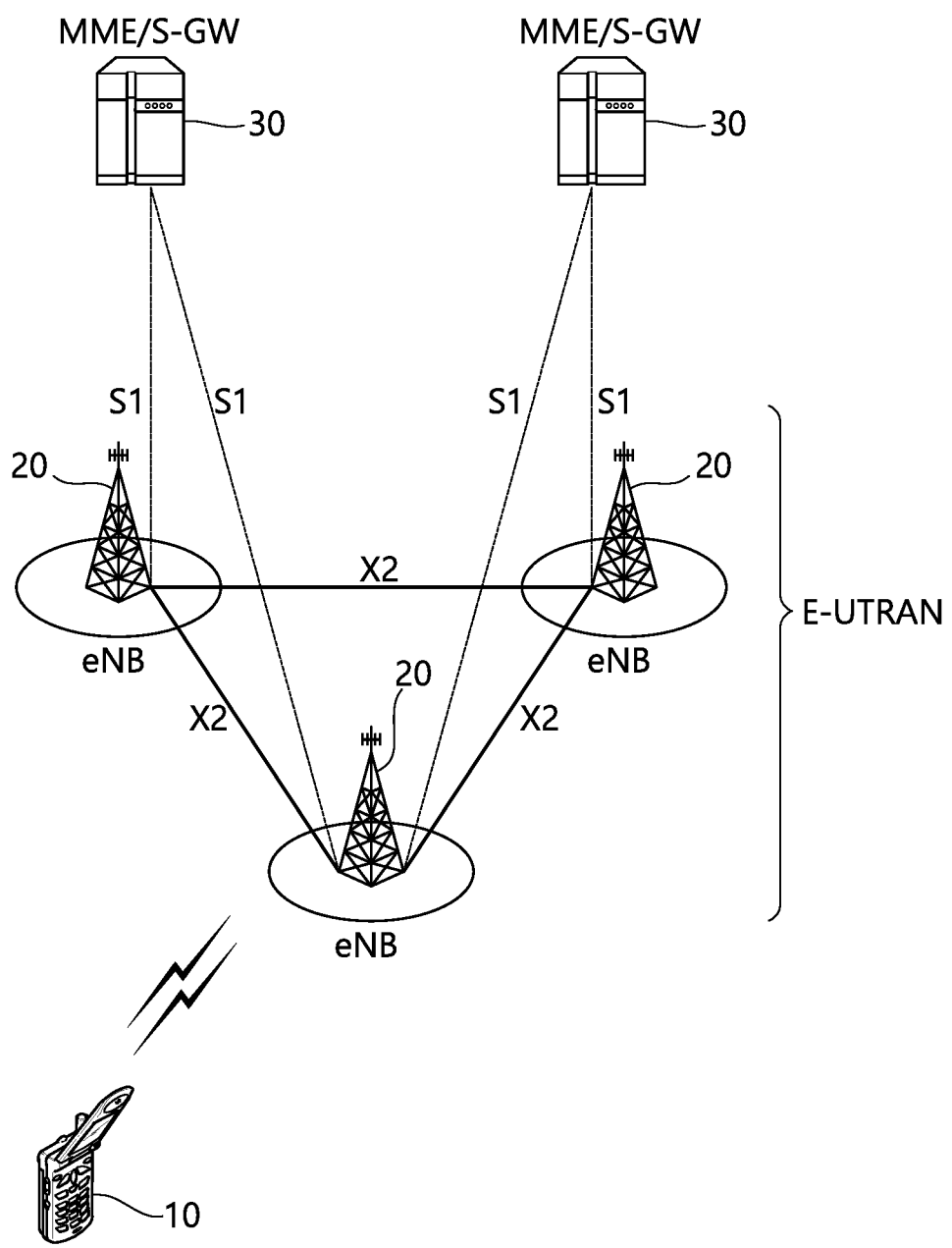
FIG. 5 shows a structure of an LTE system to which an exemplary embodiment of the present disclosure can be applied.

FIG. 5 shows a structure of an LTE system to which an exemplary embodiment of the present disclosure can be applied. This may also be referred to as an Evolved-UMTS Terrestrial Radio Access Network (E-UTRAN), or a Long Term Evolution (LTE)/LTE-A system.

Referring to FIG. 5, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicated with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base station (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a PDN as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 6:
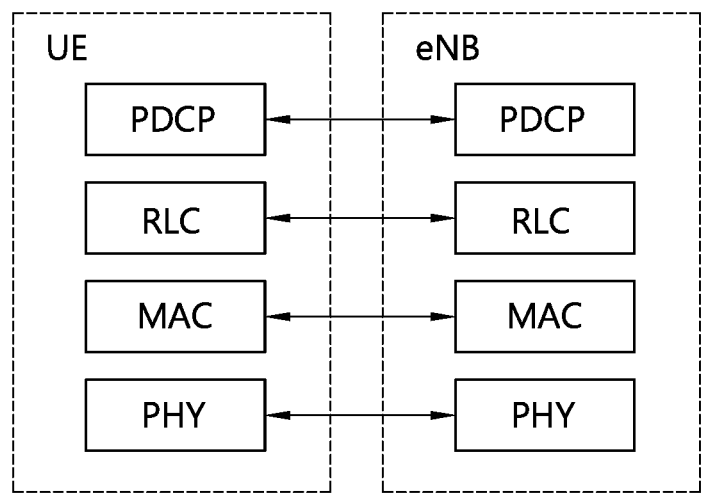
FIG. 6 shows a radio protocol architecture of a user plane to which an exemplary embodiment of the present disclosure can be applied.
Figure 7:
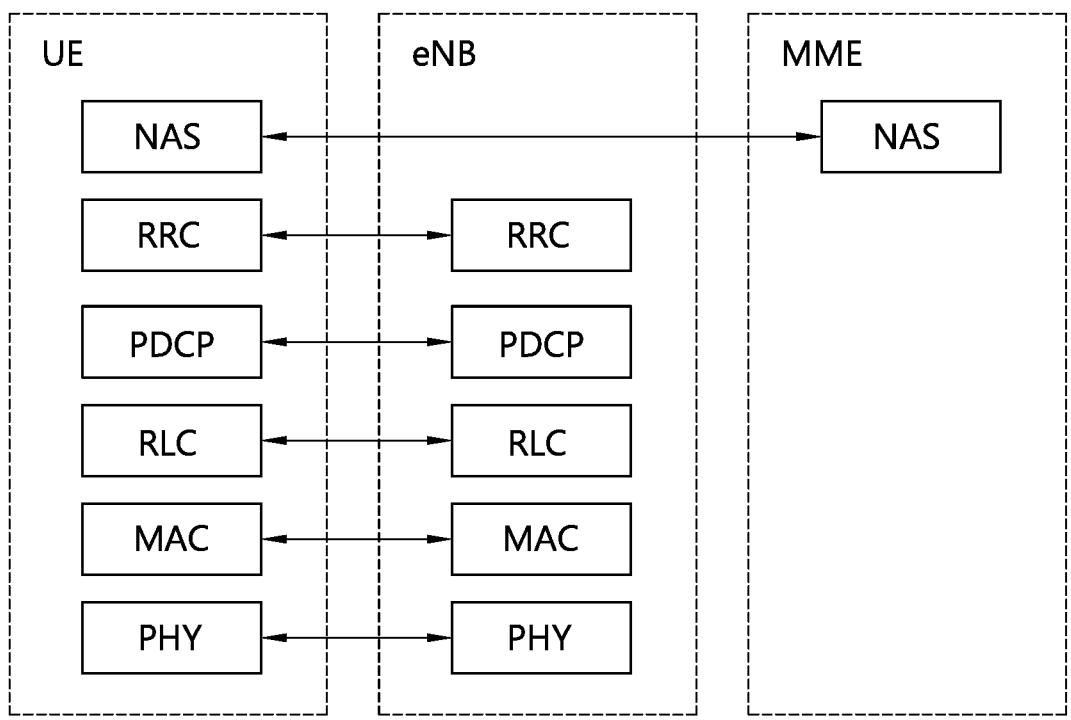
FIG. 7 shows a radio protocol architecture of a control plane to which an exemplary embodiment of the present disclosure can be applied.

FIG. 6 shows a radio protocol architecture of a user plane to which an exemplary embodiment of the present disclosure can be applied. FIG. 7 shows a radio protocol architecture of a control plane to which an exemplary embodiment of the present disclosure can be applied. The user plane is a protocol stack for user data transmission, and the control plane is a protocol stack for control signal transmission.

Referring to FIG. 6 and FIG. 7, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of RLC SDU. In order to ensure diverse quality of service (QoS) required by a radio bearer (RB), the RLC layer provides three types of operation modes, i.e., a transparent mode (TM), an unacknowledged mode (UM) and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, PDCP layer) in order to transport data between the UE and the network.

Functions of a Packet Data Convergence Protocol (PDCP) in the user plane include transfer, header compression, and ciphering of user data. Functions of a Packet Data Convergence Protocol (PDCP) in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 8:
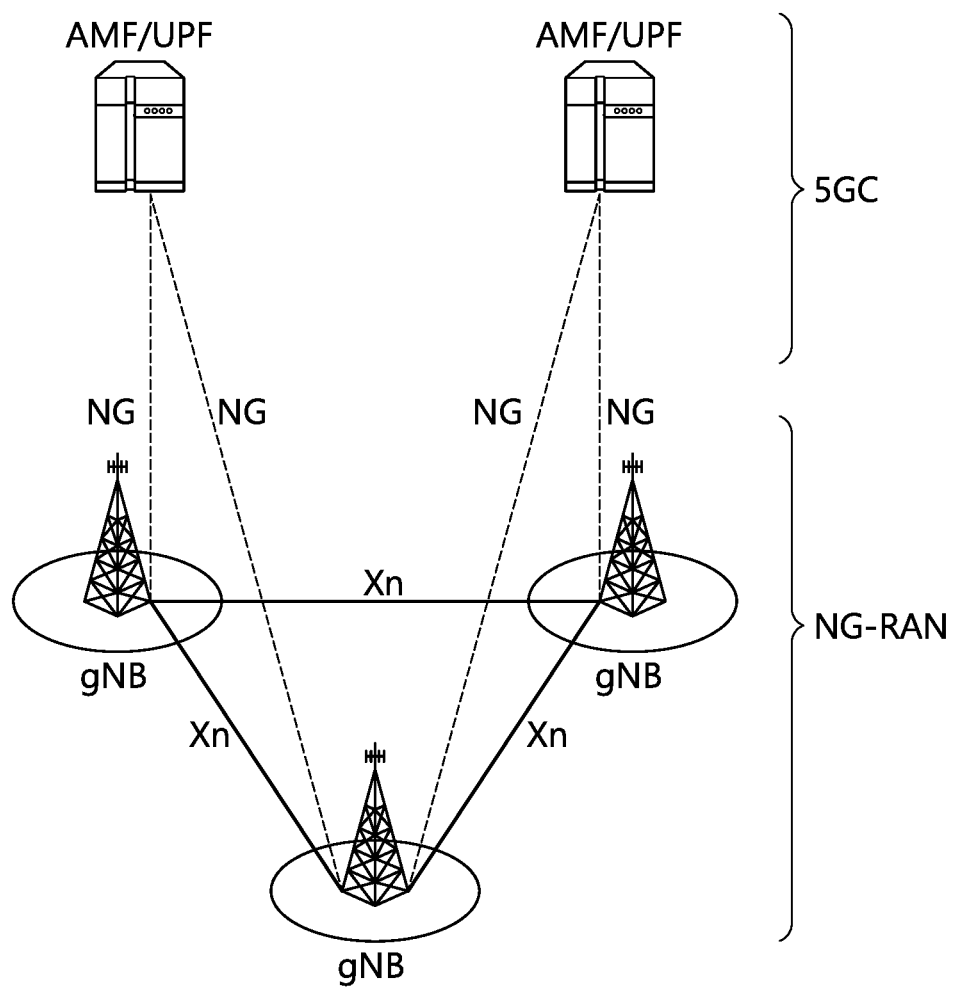
FIG. 8 shows a structure of an NR system to which an exemplary embodiment of the present disclosure can be applied.

FIG. 8 shows a structure of an NR system to which an exemplary embodiment of the present disclosure can be applied.

Referring to FIG. 8, an NG-RAN may include a gNB and/or eNB providing a user plane and control plane protocol termination to a user. FIG. 8 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 9:
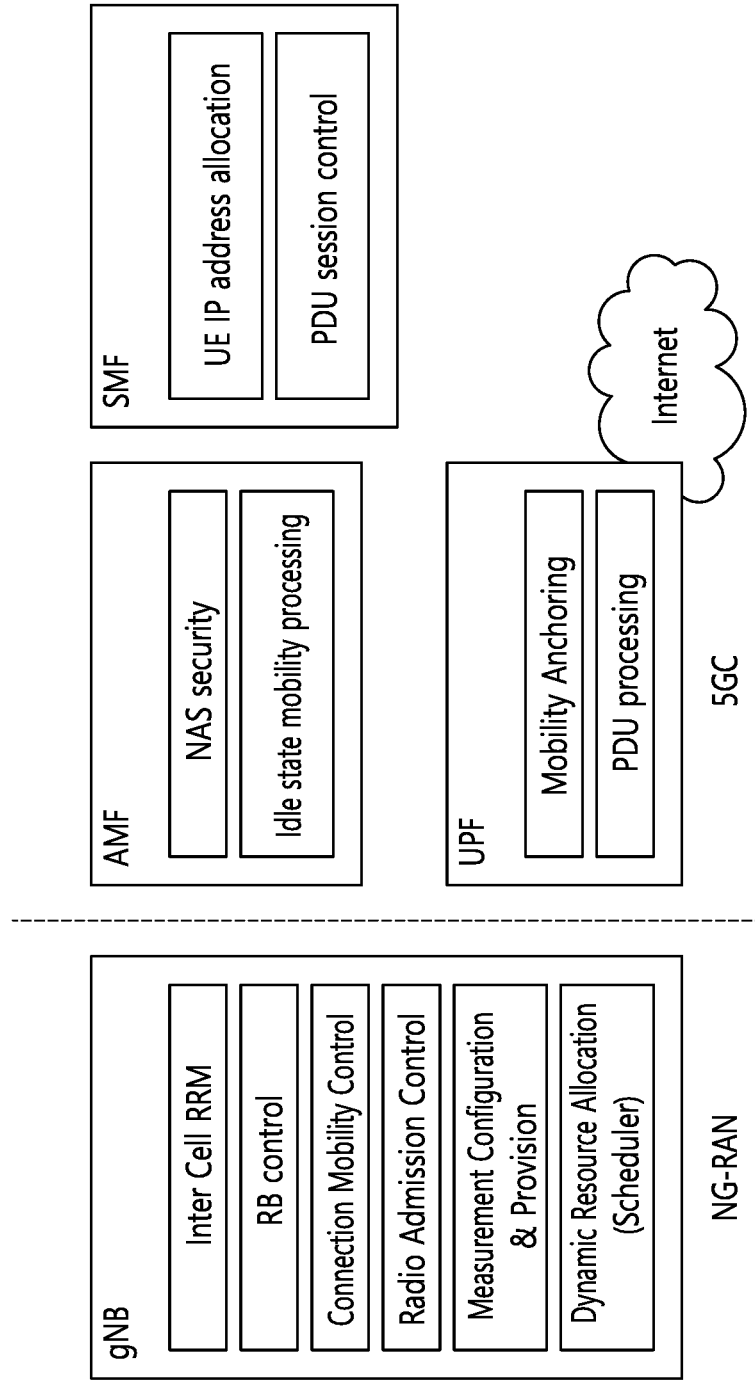
FIG. 9 shows a functional division between an NG-RAN and a 5GC to which an exemplary embodiment of the present disclosure can be applied.

FIG. 9 shows a functional division between an NG-RAN and a 5GC to which an exemplary embodiment of the present disclosure can be applied.

Referring to FIG. 9, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as NAS security, Idle state mobility processing, and so on. A UPF may provide functions, such as Mobility Anchoring, PDU processing, and so on. A Session Management Function (SMF) may provide functions, such as user equipment (UE) IP address allocation, PDU session control, and so on.

Figure 10:
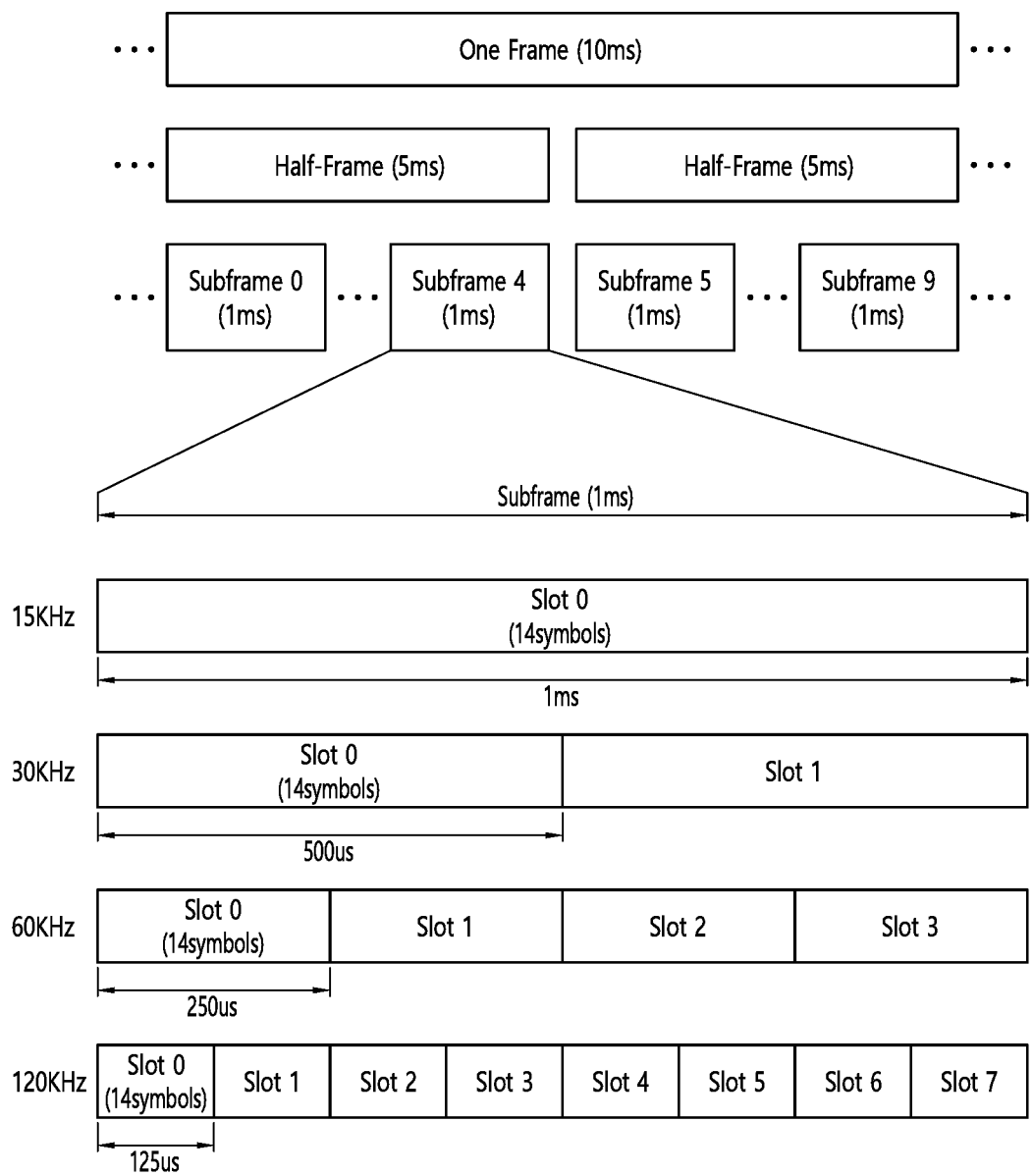
FIG. 10 shows a structure of a radio frame of an NR to which an exemplary embodiment of the present disclosure can be applied.

FIG. 10 shows a structure of a radio frame of an NR to which an exemplary embodiment of the present disclosure can be applied.

Referring to FIG. 10, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and an SC-FDMA symbol (or DFT-s-OFDM symbol).

Table 1 shown below represents an example of a number of symbols per slot ($N^{slot}_{symb}$), a number slots per frame ($N^{frame,u}_{slot}$), and a number of slots per subframe ($N^{frame,u}_{slot}$) in accordance with an SCS configuration (μ), in a case where a normal CP is used.

TABLE 1

| SCS (15*2$^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2$^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 11:
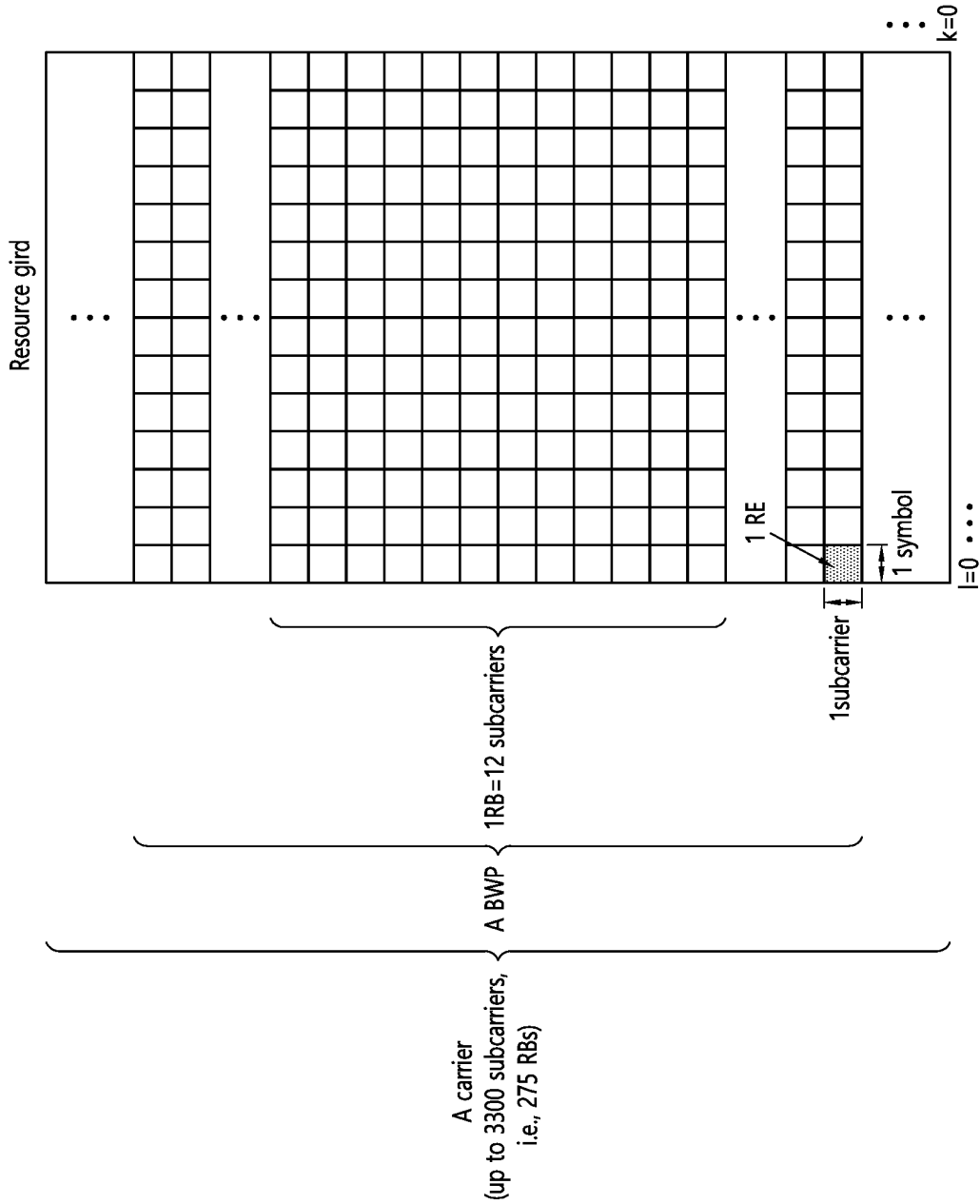
FIG. 11 shows a structure of a slot of an NR frame to which an exemplary embodiment of the present disclosure can be applied.

FIG. 11 shows a structure of a slot of an NR frame to which an exemplary embodiment of the present disclosure can be applied.

Referring to FIG. 11, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain A Bandwidth Part (BWP) may be defined as a plurality of consecutive (P)RBs in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, V2X or sidelink communication will be described in detail.

Figure 12:
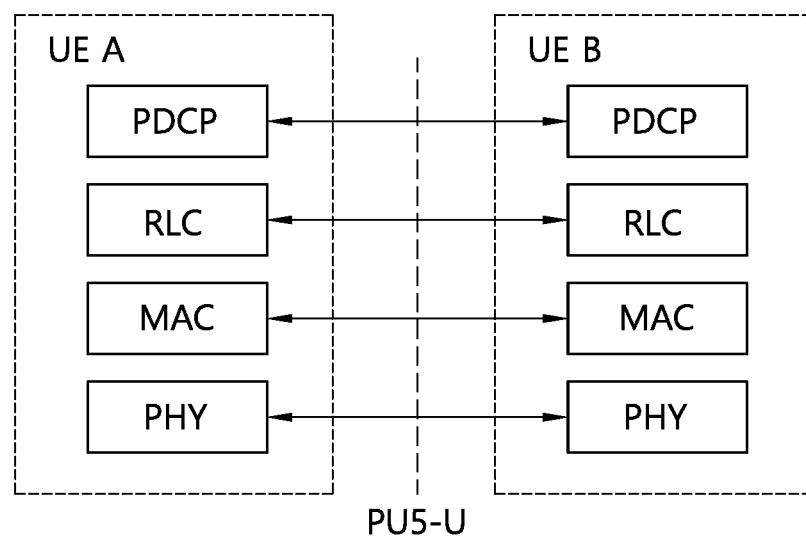
FIG. 12 shows a protocol stack for a sidelink communication to which the exemplary embodiment of the present disclosure can be applied.
Figure 12:
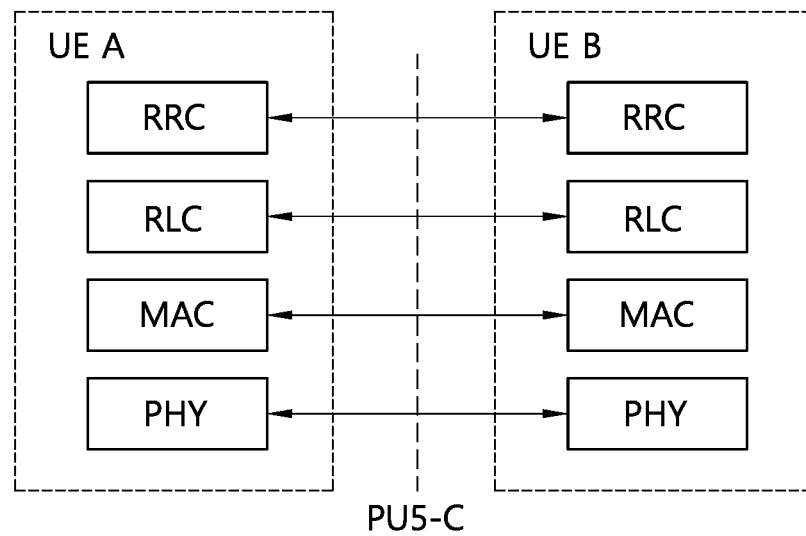

FIG. 12 shows a protocol stack for a sidelink communication to which the exemplary embodiment of the present disclosure can be applied. More specifically, (a) of FIG. 12 represents a user plane protocol stack of LTE, and (b) of FIG. 12 represents a control plane protocol stack of LTE.

Figure 13:
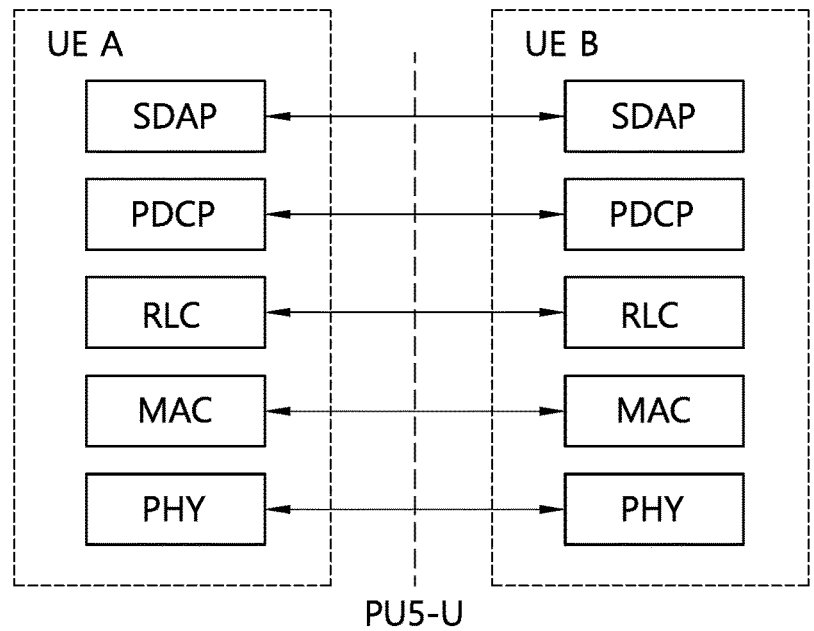
FIG. 13 shows a protocol stack for a sidelink communication to which the exemplary embodiment of the present disclosure can be applied.
Figure 13:
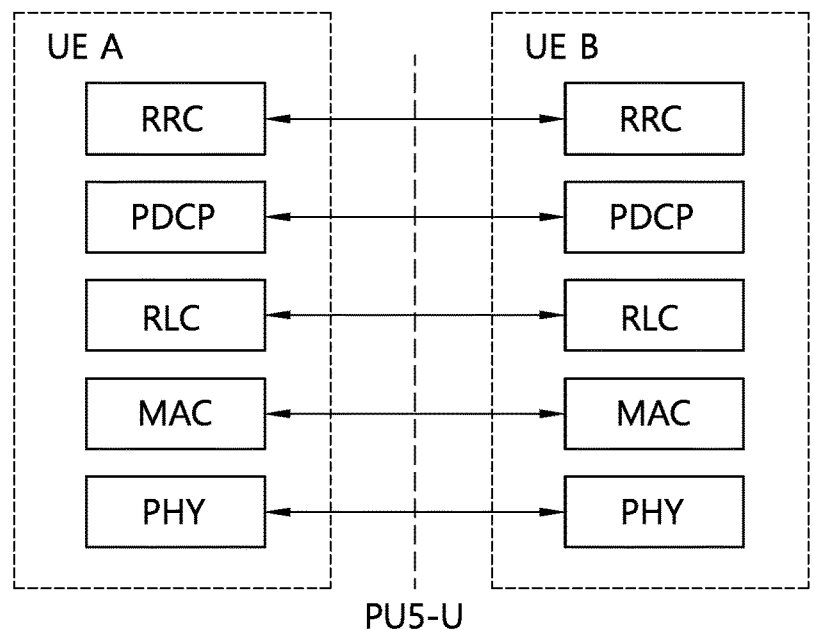

FIG. 13 shows a protocol stack for a sidelink communication to which the exemplary embodiment of the present disclosure can be applied. More specifically, (a) of FIG. 13 represents a user plane protocol stack of NR, and (b) of FIG. 13 represents a control plane protocol stack of NR.

Hereinafter, Sidelink Synchronization Signal (SLSS) and synchronization information will be described in detail.

SLSS corresponds to a sidelink specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving sidelink signals. For example, the basic information may be information related to SLSS, a Duplex mode (DM), TDD UL/DL configuration, information related to a resource pool, application types related to SLSS, a subframe offset, broadcast information, and so on.

The S-PSS, the S-SSS, and the PSBCH may be included in a block format (e.g., a sidelink SS/PSBCH block, hereinafter referred to as S-SSB). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL BWP. And, a frequency position of the S-SSB may be (pre-)configured.

Therefore, the UE is not required to perform a hypothesis detection in order to discover the S-SSB in the carrier.

Each SLSS may have a physical layer sidelink synchronization identity (ID), and the respective value may be equal to any one value ranging from 0 to 335. Depending upon any one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer sidelink synchronization ID values, values 0 to 167 may denote a value being used by a network, and values from 168 to 335 may denote a value being used outside of the network coverage.

Figure 14:
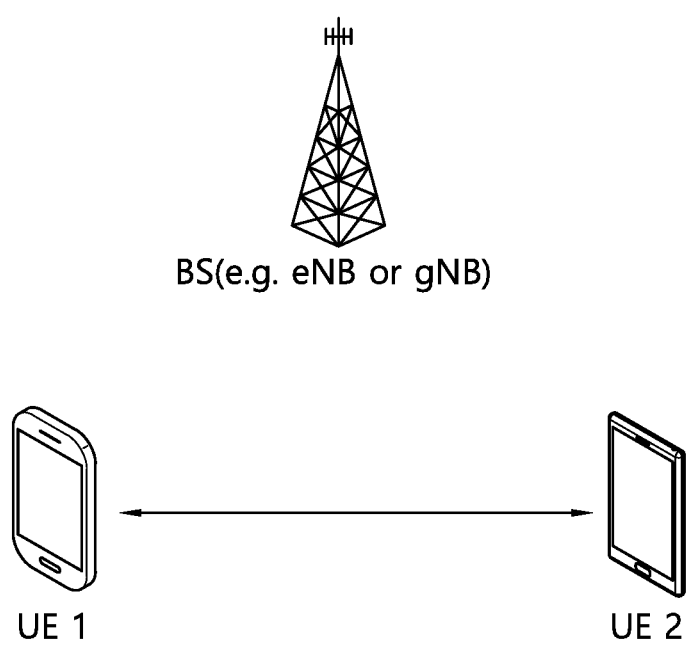
FIG. 14 shows a terminal performing V2X or sidelink communication to which an exemplary embodiment of the present disclosure can be applied.

FIG. 14 shows a terminal performing V2X or sidelink communication to which an exemplary embodiment of the present disclosure can be applied.

Referring to FIG. 14, in V2X/sidelink communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a sidelink signal by using the corresponding resource unit. User equipment 2 (UE2), which corresponds to a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its sidelink signal transmission.

Figure 15:
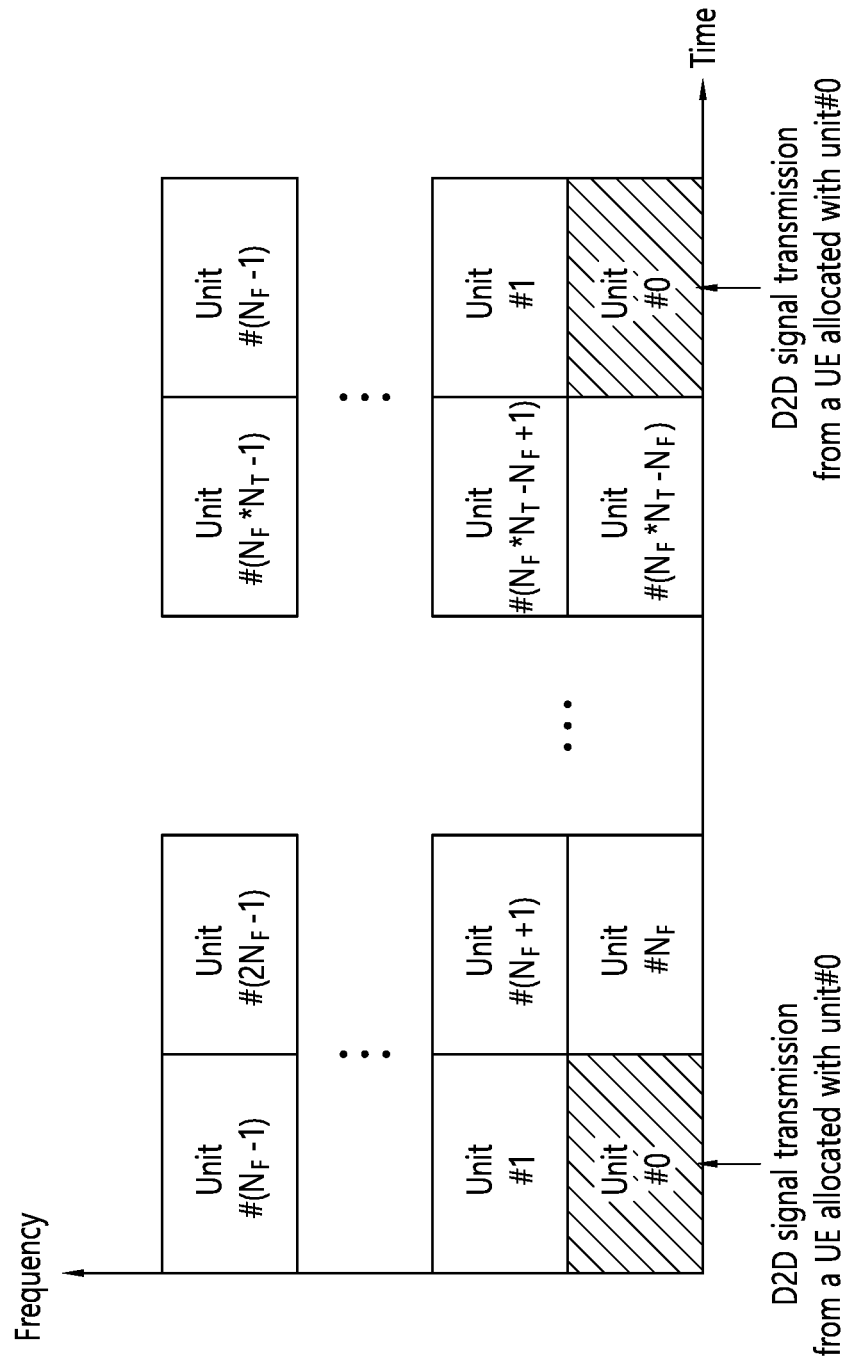
FIG. 15 shows an exemplary configuration of a resource unit to which an exemplary embodiment of the present disclosure can be applied.

FIG. 15 shows an exemplary configuration of a resource unit to which an exemplary embodiment of the present disclosure can be applied.

Referring to FIG. 15, the total frequency resources of the resource pool may be divided into NF number of resource units, the total time resources of the resource pool may be divided into NT number of resource units. Therefore, a total of NF*NT number of resource units may be defined in the resource pool. FIG. 15 shows an example of a case where the corresponding resource pool is repeated at a cycle of NT number of subframes.

As shown in FIG. 15, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit sidelink signals.

The resource pool may be segmented to multiple types. For example, depending upon the content of a sidelink signal being transmitted from each resource pool, the resource pool may be divided as described below.

(1) Scheduling Assignment (SA) may be a signal including information, such as a position of a resource that is used for the transmission of a sidelink data channel, a Modulation and Coding Scheme (MCS) or MIMO transmission scheme needed for the modulation of other data channels, a Timing Advance (TA), and so on. The SA may also be multiplexed with sidelink data within the same resource unit and may then be transmitted, and, in this case, an SA resource pool may refer to a resource pool in which the SA is multiplexed with the sidelink data and then transmitted. The SA may also be referred to as a sidelink control channel.

(2) A Physical Sidelink Shared Channel (PSSCH) may be a resource pool that is used by a transmitting UE for transmitting user data. If the SA is multiplexed with sidelink data within the same resource unit and then transmitted, only a sidelink data channel excluding the SA information may be transmitted from the resource pool that is configured for the sidelink data channel. In other words, REs that were used for transmitting SA information within a separate resource unit of the SA resource pool may still be used for transmitting sidelink data from the resource pool of a sidelink data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described sidelink signal is the same, different resource pools may be used depending upon the transmission/reception attribute of the sidelink signal. For example, even if the same sidelink data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each sidelink signal within a subframe or a number of subframes being used for the transmission of one sidelink signal) of the sidelink signal, signal intensity from the base station, a transmitting power intensity (or level) of a sidelink UE, and so on.

Hereinafter, resource allocation in a sidelink will be described in detail.

Figure 16:
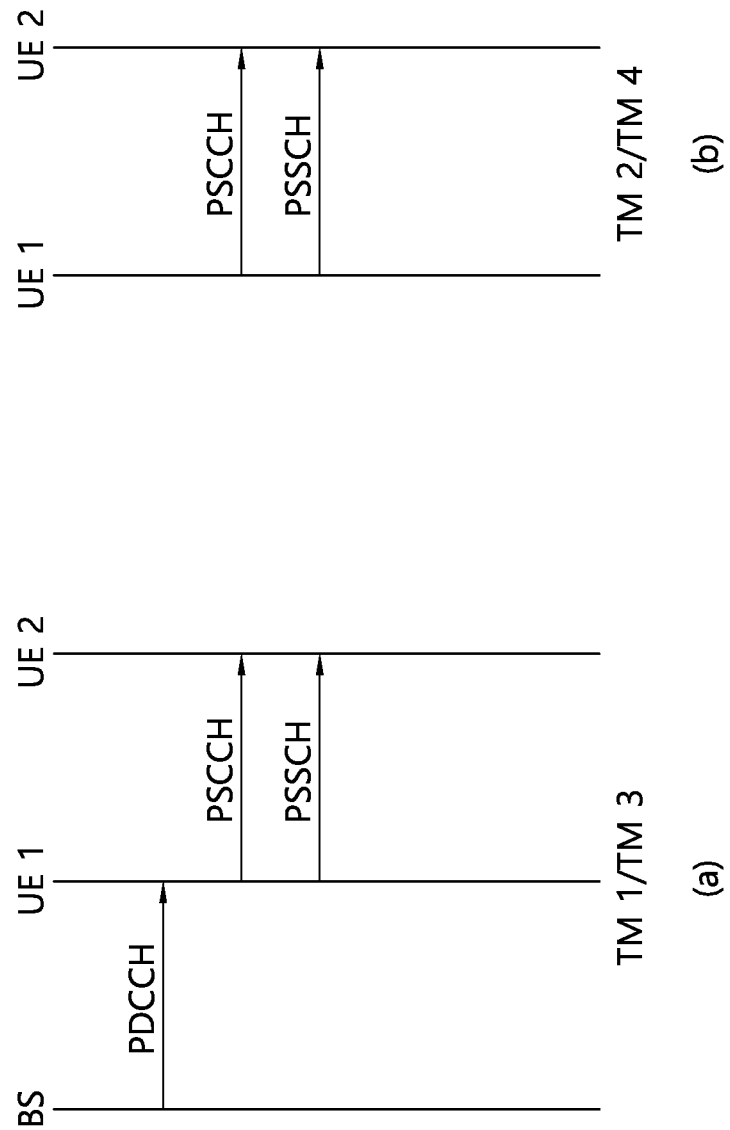
FIG. 16 shows user equipment (UE) operations according to a transmission mode (TM) being related to sidelink/V2X communication to which an exemplary embodiment of the present disclosure can be applied.

FIG. 16 shows user equipment (UE) operations according to a transmission mode (TM) being related to sidelink/V2X communication to which an exemplary embodiment of the present disclosure can be applied.

(a) of FIG. 16 represents UE operations being related to transmission mode 1 or transmission mode 3, and (b) of FIG. 16 represents UE operations being related to transmission mode 2 or transmission mode 4.

Referring to (a) of FIG. 16, in transmission modes 1/3, the base station performs resource scheduling to UE1 via PDCCH (more specifically, DCI), and UE1 performs sidelink/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE sidelink, transmission mode 1 may be applied to a general sidelink communication, and transmission mode 3 may be applied to a V2X sidelink communication.

Referring to (b) of FIG. 16, in transmission modes 2/4, the UE may schedule resources on its own. More specifically, in case of LTE sidelink, transmission mode 2 may be applied to a general sidelink communication, and the UE may select a resource from a predetermined resource pool on its own and may then perform sidelink operations. Transmission mode 4 may be applied to a V2X sidelink communication, and the UE may carry out a sensing/SA decoding procedure, and so on, and select a resource within a selection window on its own and may then perform V2X sidelink operations. After transmitting the SCI to UE2 via PSCCH, UE1 may transmit SCI-based data via PSSCH. Hereinafter, the transmission mode may be abbreviated to mode.

In case of NR sidelink, at least two types of sidelink resource allocation modes may be defined. In case of mode 1, the base station may schedule sidelink resources that are to be used for sidelink transmission. In case of mode 2, the user equipment (UE) may determine a sidelink transmission resource from sidelink resources that are configured by the base station/network or predetermined sidelink resources. The configured sidelink resources or the pre-determined sidelink resources may correspond to a resource pool. For example, in case of mode 2, the UE may autonomously select a sidelink resource for transmission. For example, in case of mode 2, the UE may assist (or help) sidelink resource selection of another UE. For example, in case of mode 2, the UE may be configured with an NR configured grant for sidelink transmission. For example, in case of mode 2, the UE may schedule sidelink transmission of another UE. And, mode 2 may at least support reservation of sidelink resources for blind retransmission.

Procedures related to sensing and resource (re-)selection may be supported in resource allocation mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL RSRP measurement, which is based on SL DMRS. The resource (re-)selection procedure may use a result of the sensing procedure in order to determine the resource for the sidelink transmission.

Figure 17:
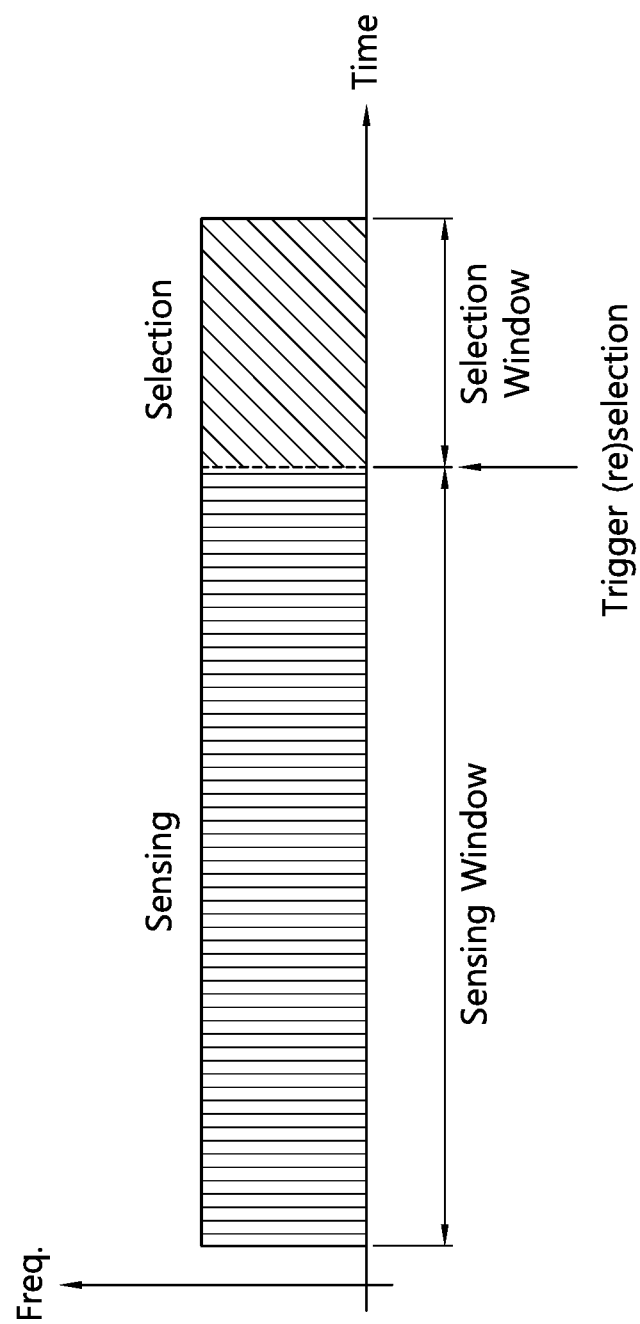
FIG. 17 shows an example where a transmission resource to which an exemplary embodiment of the present disclosure can be applied.

FIG. 17 shows an example where a transmission resource to which an exemplary embodiment of the present disclosure can be applied.

Referring to FIG. 17, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceed a threshold value from the selection window. Thereafter, the UE may randomly select a sidelink resource from the remaining resources within the selection window.

Alternatively, the UE may measure a Received signal strength indication (RSSI) of the periodic resources within the sensing window and may then determine the resources having low interference (e.g., the lower 20% of the resources). Additionally, the UE may also randomly select a sidelink resource from the resources included in the selection window among the periodic resources. For example, in case the UE fails to perform decoding of the PSCCH, the UE may use the above described methods.

Meanwhile, in sidelink communication, V2X communication, enhanced V2X (eV2X) communication or NR V2X communication, various types of UEs may co-exist. For example, in case communication between UEs is performed in a situation where various types of UEs co-exist, various problems may occur. For example, in this specification, a UE type may be a set of UEs each having a different UE category (e.g., Pedestrian UE, Road Side Unit (RSU), passenger vehicle, truck, bus, train, and so on) or antenna height (e.g., height of a physical antenna equipped to a UE or vehicle height, and so on) of the UE (or configured of a combination of the above). In this specification, although the description is focused on the antenna height of a vehicle for simplicity, in the following description, the antenna height of a vehicle may be a difference in actual physical antenna heights of vehicles, or the antenna height of a vehicle may be a difference in antenna heights according to various UE types.

In the conventional LTE V2X system, it is assumed that all vehicles use the same antenna. More specifically, in a simulation for deriving a performance of a V2X system, it is assumed that a vehicle UE and a pedestrian UE both use antennas having the same height. For example, it is assumed that a vehicle UE and a pedestrian UE both use an omni 2D antenna having a height of 1.5(m), and a simulation for deriving a performance of a V2X system is performed based on a parameter related to the corresponding antenna height. That is, in the conventional LTE V2X communication, it is assumed that the UEs perform communication between one another while all using the same antenna, and, based on the aforementioned assumption, a transmission mechanism, such as (sidelink) resource allocation and (sidelink) power control, has been developed. In case it is assumed that all UEs perform communication by using the same antenna height, there is no difference in antenna heights during channel generation between UE links. Additionally, since all UEs transmit sidelink data or sidelink control information by using the same transmission power (or transport power), resource allocation could be performed via sensing in a fair situation even in light of the reception power.

However, in an actual practical road, various vehicles may exist. For example, the size and height of a vehicle vary in accordance with small-sized cars, middle-sized cars, large-sized cars, and trucks of various sizes also exist. Additionally, as compared to passenger vehicles, there is a large difference in the quantitative height of trucks. As described above, due to differences in the physical size and/or height of vehicles, even if antennas having the same height are equipped to different vehicles, there may be a large difference in the actual antenna heights from the ground surface depending upon the vehicle type. For example, in case of equipping each of a small-sized car and a large-sized truck with an omni 2D antenna having a height of 1.5(m), even though the antennas have the same height, the height of the antenna equipped to the large-sized truck may actually be higher than the height of the antenna equipped to the small-sized car.

In addition to the aforementioned differences, there may exist various heights and types of antennas being used for each type of vehicle. For example, generally, as the size of the vehicle is larger, an antenna having a higher height may be used. Therefore, there may exist a wider range of differences in antenna heights being used in a vehicle-to-vehicle transmission mechanism.

Therefore, in order to apply a practical antenna height in V2X, eV2X or NR V2X communication, for example, as shown below in Table 3, different UE types according to the antenna height have been defined for a simulation methodology for eV2X (e.g., NR V2X, Rel-16 eV2X).

TABLE 3

Three vehicle types are defined as follows.

Type 1 (passenger vehicle with lower antenna position): length 5 meters, width 2.0 meters, height 1.6 meters, antenna height 0.75 meters
Type 2 (passenger vehicle with higher antenna position): length 5 meters, width 2.0 meters, height 1.6 meters, antenna height 1.6 meters
Type 3 (truck): length 13 meters, width 2.6 meters, height 3 meters, antenna height 3 meters
FFS how to drop different vehicle types
The difference of the vehicle type does not change the channel model potentially except the following aspects:

Pathloss equation where the antenna height is set according to the vehicle type
Loss caused by vehicle blockage (details to be discussed in the vehicle blockage modeling)
Radiation pattern Referring to Table 3, in eV2X, the vehicle type for simulation may be divided into three different types. For example, Type 1 and Type 2 may indicate a case where different antenna heights are equipped to passenger vehicles having the same size. For example, Type 3 may indicate a case where an antenna is equipped to a truck. For example, the antenna height of Type 3 may be higher than the antenna height of Type 2, and the antenna type of Type 2 may be higher than the antenna height of Type 1.

Furthermore, a UE dropping model, in which UE types co-exist, may be supported. For example, in case of a freeway, three different options may exist. In a specific option, each type of UE may co-exist at a random ratio, and, in another option, a dropping model for considering platooning, which is one of eV2X services, may also be supported. Additionally, in case of an urban case, a heterogeneous vehicle type, in which each type of UE co-exist, may be defined in a specific option.

By using an antenna parameter used in a simulation for eV2X technology development, the above-described assumption has been more simplified than an actual practical situation. That is, in a practical road environment, a wider variety of UE types may exist in addition to the three different UE types, which are described above, and a wider variety of antenna types may exist in accordance with the wider variety of UE types. Further, in an actual road environment, different types of UE portions may be configured in a specific zone for V2X communication at a random likelihood. Evidently, although it may be difficult to define a simulation parameter for applying all of the actual road environment, it may be needed to develop the V2X technology while considering the problems that may occur in accordance with the antenna height. Additionally, the transmission mechanism applying the antenna height may be authenticated in a future actual road environment and may be calibrated accordingly.

Meanwhile, essentially, when considering a propagation characteristic, a propagation coverage may vary in accordance with an antenna height. For example, when it is assumed that a same transmission power is used, a propagation being propagated from a high antenna may have a larger coverage than a propagation being propagated from a low antenna. According to the propagation, this is because, since the likelihood of attenuation caused by a reflection of a propagation being propagated from a low height is higher than the likelihood of attenuation of a propagation being propagated from a high height, the attenuation caused by the reflection is indicated as a propagation loss. For example, a case where a vehicle having a high antenna and vehicles each having a low antenna co-exist in a specific zone will be assumed. At this point, a link between a high-antenna vehicle (A) and a low-antenna vehicle (B) is as described below.

When a distance between A and B is maintained, since a propagation being transmitted from A to B has a large coverage, as described above, the propagation being transmitted from A to B may reach B at a relatively high reception power. Conversely, since a propagation being transmitted from B to A has a small coverage, as described above, the propagation being transmitted from B to A may reach A at a relatively low reception power. Therefore, a low-antenna vehicle (B) may receive an interference, which is caused by a high reception power from a vehicle having a high antenna, such as A. In this case, during a process of using resource allocation and reception RSRP, an unfair phenomenon may occur in accordance with the antenna height of a vehicle.

Additionally, a number of encountered blockages or a likelihood of encountering a blockage until a propagation propagated from a vehicle having high antenna height reaches a receiver through a link may be smaller (or lower) than a number of encountered blockages or a likelihood of encountering a blockage until a propagation propagated from a vehicle having a low antenna height reaches a receiver through a link. For example, a blockage may be an object that blocks the link between vehicles, such as another vehicle, a building, a road side unit (RSU), such as traffic light, a tree, and so on. For example, in a case where trucks and vehicles all using omni-directional antennas exist, since the propagation being transmitted from a truck is propagated from a high height (or high-level height), the propagation being transmitted from a truck may encounter relatively fewer blockages than a propagation being transmitted from a passenger vehicle. Additionally, even if 3D beamforming is performed by using a directional antenna, since a specific beam being transmitted from a truck is also transmitted from a high antenna position, the beam being transmitted from the truck may encounter relatively fewer blockages than a beam being transmitted from a passenger vehicle. Even if a transmitting UE has transmitted a propagation from a same position, in case the corresponding propagation encounters a large number of blockages, the reception power of the receiving UE may relatively decrease. For example, if a truck having a high antenna height and a passenger vehicle having a low antenna height each transmits a propagation to a same receiving UE from a same position, the propagation being transmitted from the passenger vehicle may encounter a larger number of blockages than the propagation being transmitted from the truck. Therefore, the receiving UE receives the propagation being transmitted from the passenger vehicle at a reception power that is lower than the propagation being transmitted from the truck. In this case, during a process of using resource allocation and reception RSRP, an unfair phenomenon may occur in accordance with the antenna height of a vehicle.

In case vehicle types having various types co-exist in sidelink communication or V2X communication, the problems that may occur in such case have already been described above. Hereinafter, in order to resolve the above-described problems, according to an embodiment of the present disclosure, a method for adjusting/determining, by a UE, a transmission parameter based on a UE type and an apparatus supporting the same will be described in detail.

Figure 18:
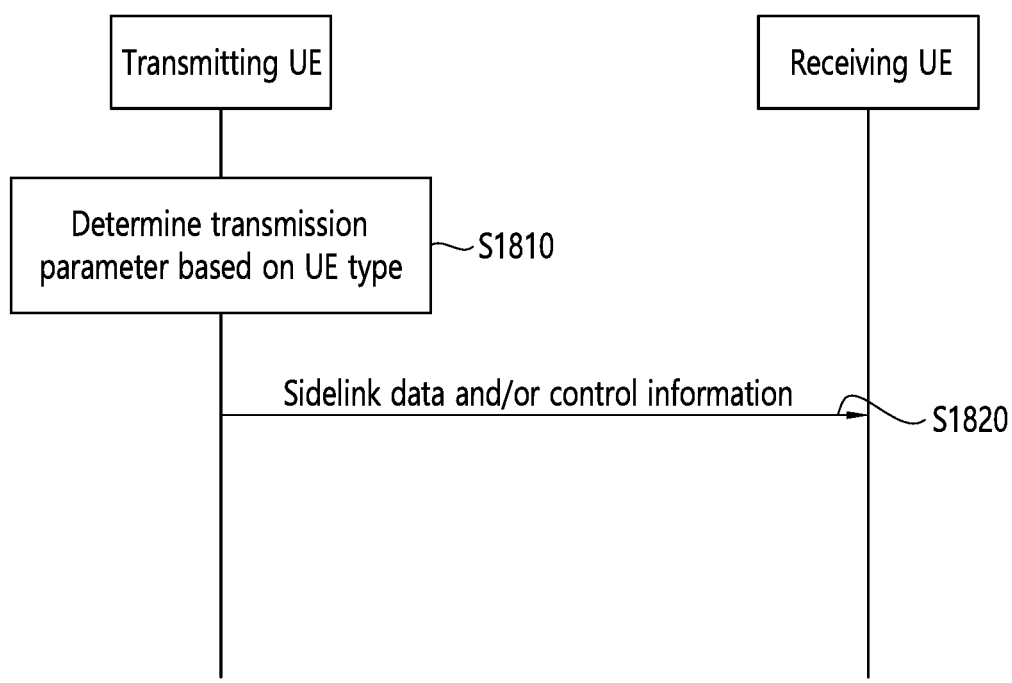
FIG. 18 shows a method for adjusting/determining, by a UE, a transmission parameter based on a UE type according to an exemplary embodiment of the present disclosure.

FIG. 18 shows a method for adjusting/determining, by a UE, a transmission parameter based on a UE type according to an exemplary embodiment of the present disclosure.

Referring to FIG. 18, in step S1810, a transmitting UE may adjust/determine a transmission parameter in accordance with a UE type. For example, the transmitting UE may differently configure a transmission parameter in accordance with the UE type. Herein, the transmission parameter may collectively refer to all variables that can be configured by the UE for the transmission. For example, the transmission parameter may include at least one of transmission power, Modulation and Coding Scheme (MCS), variables (e.g., RSRP-threshold) that are needed for resource allocation (e.g., sensing operation), priority information, and/or variables related to the antenna of the UE (e.g., antenna gain, a horizontal angle of an antenna element, a vertical angle of an antenna element, and/or antenna beam width, and so on). Hereinafter, operations of a UE and/or operations of a base station for each transmission parameter will be described in detail. The base station may be replaced with an RSU or a higher-level entity related to V2X.

1) Method for Determining/Adjusting a Transmission Power

According to an embodiment of the present disclosure, a transmitting UE may differently configure a transmission power (or transport power) in accordance with a type of the transmitting UE. For example, the transmitting UE may differently configure a transmission power in accordance with an antenna height of the transmitting UE. More specifically, the transmission power may be differently configured for each specific antenna height. Alternatively, the transmission power may be differently designated for each range of a specific antenna height.

For this, a base station may collect information within a specific zone or a specific cell. And, the base station may (pre-)configure a transmission power per antenna height or a transmission power per range of antenna height, for a UE, via cell-specific signaling information or UE-dedicated signaling information. Therefore, the UE may configure a transmission power in accordance with an antenna height. Alternatively, the base station may (pre-)configure (transmission power) offset information per antenna height or (transmission power) offset information per range of antenna height, for a UE, via cell-specific signaling information or UE-dedicated signaling information. For example, when a case of defining a reference transmission power (e.g., 23 [dB]) of a UE is assumed, a base station may (pre-)configure offset information for the UE from the reference transmission power. Therefore, the UE may decrease or increase the transmission power in comparison with the reference transmission power in accordance with the antenna height based on the offset information.

For example, by adjusting the transmission power in accordance with the antenna height, the base station may allow a truck having a high antenna height to perform transmission at a lower transmission power than a vehicle having a low antenna height. Thus, in the aspect of a reception performed by the vehicle having a low antenna height, the reception power, which varies in accordance with the antenna height, may become consistent on average. More specifically, for example, in order to maintain a consistent level of transmission power within a specific zone or a specific cell, the base station may obtain a portion of an antenna height through the collected vehicle information. And, the base station may propose/configure a transmission power for a vehicle within the specific zone or specific cell in accordance with the obtained portion of the antenna height.

However, a vehicle portion per antenna height may be time-variable within a specific zone or specific cell. Accordingly, a pre-configured transmission power may not operate as an appropriate transmission parameter within a zone of the antenna height of the varied (or changed) portion. Therefore, for example, a transmission power per antenna height or a transmission power per range of antenna height may also be time-variable within a specific zone or specific cell. Therefore, the base station may collect periodically or aperiodically collect vehicle information within a specific zone or specific cell. And, the base station may periodically or aperiodically configure a transmission power that is changed per antenna height or a transmission power that is changed per range of antenna height, for the UE, via cell-specific signaling information or UE-dedicated signaling information, and so on. Therefore, the UE may re-configure the transmission power in accordance with the antenna height. Alternatively, the base station may periodically or aperiodically configure (transmission power) offset information that is changed per antenna height or (transmission power) offset information that is changed per range of antenna height, for the UE, via cell-specific signaling information or UE-dedicated signaling information, and so on. Therefore, the UE may decrease or increase the transmission power in comparison with the reference transmission power in accordance with the antenna height based on the varied (or changed) offset information.

2) Method for Determining/Adjusting an MCS

According to an embodiment of the present disclosure, a transmitting UE may adjust an MCS being used for the transmission in accordance with the type of transmitting UE. And, the transmitting UE may select a Transport Block Size (TBS) based on the adjusted MCS. For example, a UE having a high antenna height may use a high MCS index, and a UE having a low antenna height may use a relatively low MCS index. Therefore, the UE having a high antenna height may secure a high transmission data rate and perform transmission, and the UE having a low antenna height may obtain a low transmission data rate. However, even though there is gain or loss in the data rate, due to a difference in the reception power, an actual target Block Error Rate (BLER) is expected to be similar.

Alternatively, for example, in order to prevent the UE having a low antenna height from undergoing (or experiencing) loss in data rate, an MCS parameter may be determined based on a UE (e.g., passenger vehicle) having an antenna height that is lower than a specific height. And, UEs each having an antenna height that is equal to or higher than a specific height may gradually determine/select a high MCS parameter and may, then, perform sidelink transmission based on the corresponding MCS parameter.

For this, the base station may (pre-)configure an MCS range per antenna height or an MCS range per range of antenna height, for a UE, via cell-specific signaling information or UE-dedicated signaling information, and so on. Based on the an MCS range that is (pre-)configured by the base station, the UE may select an MCS value in accordance with its antenna height. Thereafter, the UE may determine a TBS in accordance with the selected MCS.

3) Method for Performing a Sensing Operation

According to an embodiment of the present disclosure, a transmitting UE may perform a sensing operation by changing a parameter that is used during a sensing process in accordance with a type of the transmitting UE. Reference may be made to Clause 14.1.1.6 of 3GPP TS 36.213 15.1.0 for a more detailed description on the sensing process. When referring to Clause 14.1.1.6 of 3GPP TS 36.213 15.1.0, the sensing operation may be broadly summarized into 3 steps.

Step 1: A step of configuring, by the UE, a selection window

Step 2: A step of measuring, by the UE, RSRP of an area (e.g., PSSCH) transmitting data indicated by an area (e.g., PSCCH) from which control information is transmitted, comparing, by the UE, the measured RSRP with a specific threshold value related to transmission/reception priority information, and excluding, by the UE, resources exceeding the threshold value from a resource allocation selection candidate group Step 3: A step of excluding the remaining resource excluding 20% of the resource based on an RSSI, which is measured by the UE More specifically, in Step 2 of the conventional sensing process, the UE may measure RSRP of a data area (e.g., PSSCH) being indicated by control information (e.g., PSCCH or SCI), and then the UE may compare the measured RSRP with a specific threshold value related to transmission/reception priority information. Thereafter, based on the measured RSRP and the threshold value, the UE may determine whether to exclude the corresponding section from a resource allocation selection candidate group or to maintain the corresponding section without modification. Herein, for example, the existing (or conventional) threshold value may be determined only by the priority information of a transmission packet and priority information of a reception packet.

Conversely, according to an embodiment of the present disclosure, the transmitting UE may change the threshold value in accordance with the type of the transmitting UE, and the transmitting UE may perform a sensing operation based on the changed threshold value. For example, in an environment where the reception power between different receiving UEs is not consistent, due to a difference in transmission parameters, for example, in a V2X environment where all UEs use omni-directional antennas and respectively perform transmission to antennas each having a different height, the transmitting UE may change the threshold value in accordance with the antenna height of the transmitting UE. For example, for a UE having a low antenna height, in order to provide more protection to the resource selection of the UE having a low antenna height, the UE having a low antenna height may select a threshold value that is lower than a threshold value, which is configured based on priority. By performing the above-described operation, the UE having a low antenna height may select resources having a Sidelink Received Signal Strength Indicator (S-RSSI) that is relatively lower than a UE having a high antenna height. For example, the changed threshold value may be applied when a UE initially selects a threshold value based on priority. Alternatively, for example, the threshold value may be changed by using a method of applying an additional offset to the threshold value, which is configured based on priority. Herein, the offset may be configured for a UE via pre-defined signaling or RRC signaling.

Alternatively, apart from having the UE change the threshold value during the sensing process, for example, the UE may change a ratio for reserving a resource selection candidate group from a total resource candidate group. In this specification, the resource selection candidate group may be referred to as a resource candidate group. According to the conventional (or existing) LTE V2X operation, a UE may perform operations of Step 2 and Step 3 on the total resource candidate group. As a result, the UE may report a remaining 20% ratio of the resource selection candidate group to a higher layer. In this case, if this results in an unfair resource selection, due to a difference in reception power according to the antenna height, for example, in order to protect resource selection of UEs having low antenna heights, a method for reducing a ratio of the resource selection candidate group that can be selected by a UE having a high antenna height may be considered. More specifically, a ratio of the resource selection candidate group that can be selected by UEs having high antenna heights may be lower than a ratio of the resource selection candidate group that can be selected by UEs having low antenna heights. For example, UEs having antenna heights that are lower than a specific height may reserve, through the sensing process, 20% of the total resource candidate group as a resource selection candidate group, whereas UEs having high antenna heights may reserve, through the sensing process, a ratio (e.g., 15% or 10%) of resources lower than 20% as the resource selection candidate group. Accordingly, UE having low antenna heights may have a relatively larger resource selection candidate group as compared to the UEs having high antenna heights. As a result, in the aspect of performance of a system in which multiple UEs perform transmission/reception, performance degradation according to the antenna height may not be significant.

4) Method for Configuring/Limiting an Angle when Performing Beamforming

According to an embodiment of the present disclosure, the transmitting UE may adjust/limit a range of horizontal angle or vertical angle for beamforming in accordance with the type of the transmitting UE. Alternatively, the transmitting UE may adjust/limit a beam width for beamforming in accordance with the type of the transmitting UE. For example, according to the antenna height of the transmitting UE, a horizontal angle or vertical angle of an antenna for beamforming may be limited to a specific range. For example, according to the antenna height of the transmitting UE, a beam width for beamforming may be limited to a specific range.

For example, the above-described problem(s) and proposed method(s) may be influenced by various types of antennas (e.g., omni-directional antenna, directional antenna, and so on) and transmission methods (e.g., 3D-beamforming transmission, non-beamforming transmission, and so on). For example, in case a UE performs 3D-beamforming by using a directional antenna, the antenna gain may vary depending upon the horizontal angle, the vertical angle, or the beam width of the antenna. And, a difference in such antenna gain may mitigate or aggravate the above-described problems caused by the antenna height. That is, for example, if a UE having a low antenna height performs 3D beamforming, the UE having a low antenna height may obtain additional antenna gain through its antenna angle. In this case, since the UE having a low antenna height has obtained additional antenna gain, the UE having a low antenna height may not need to adjust other transmission parameters.

Therefore, in an environment where the UE can obtain antenna gain, for example, in an environment where the UE performs beamforming, according to the antenna height of the UE performing beamforming, a range of horizontal angle and/or vertical angle for beamforming or a beam width may be limited to a specific range.

For example, in order to allow a UE having a low antenna height to obtain a greater antenna gain, the base station or RSU may configure an angle range of antenna elements for the UE having a low antenna height to a narrow range. That is, the base station or RSU may configure settings so that the UE having a low antenna height can maintain a small (or narrow) beam width. Thereafter, the UE having a low antenna height may perform beamforming within a narrow angle range. Conversely, for example, in order to prevent a UE having a high antenna height from obtaining an excessively high antenna gain, the base station or RSU may configure an angle range of antenna elements for the UE having a low antenna height to a wide range. That is, the base station or RSU may configure settings so that the UE having a high antenna height can maintain a large (or wide) beam width. Thereafter, the UE having a high antenna height may perform beamforming within a wide angle range. For example, the base station or a node managing V2X (e.g., RSU) may (pre-)configure the angle range of each antenna element, for the UE, in order to perform beamforming via pre-defined signaling.

Additionally, according to the embodiment of the present disclosure, UEs having antenna heights of a specific range may be configured as a specific set (or group). For example, a group of UEs may be configured per antenna height within a specific zone or per antenna height of a specific range. For example, among eV2X services, there is a group driving service, which is referred to as 'platooning'. Although platooning is a main use case of the logistics industry for transporting cargo, platooning (or group driving) of passenger vehicles, or platooning (or group driving) of various types of vehicles are also possible. When considering a specific type of platooning, such as cargo transportation, platooning may be performed among trucks. And, in this case, it will be expected that the vehicle heights will be within a similar range and the respective antenna heights will also be within a similar range. Accordingly, trucks intending to perform the above-described group driving (i.e., platooning), may be configured as a specific vehicle set within a specific zone. Additionally, multiple sets may exist within the corresponding zone. Therefore, the methods that are proposed, as described above, may be applied to each set. That is, the method(s) proposed in this specification may be applied to each UE or may be applied to each UE set. For example, if a complexity burden exists when applying the transmission parameter adjusting method to the transmission of all vehicles within the specific cell or zone, the base station or RSU may configure setting so that the transmission parameters can be adjusted only for the UE set performing platooning. In case of adjusting the transmission parameters for each UE set, there may be a gain in the aspect of signaling, and there may also be advantages in the aspect of management by the base station, which controls and manages services.

Referring back to FIG. 18, in step S1820, the transmitting UE may transmit sidelink data and/or control information to a receiving UE, based on a transmission parameter, which is determined based on the UE type.

According to an embodiment of the present disclosure, when UEs having various types co-exist in V2X communication, for example, the transmitting UE may adjust transmission parameters based on antenna heights. Therefore, when UEs having various types co-exist in V2X communication, UE-to-UE sidelink communication may be efficiently performed.

Figure 19:
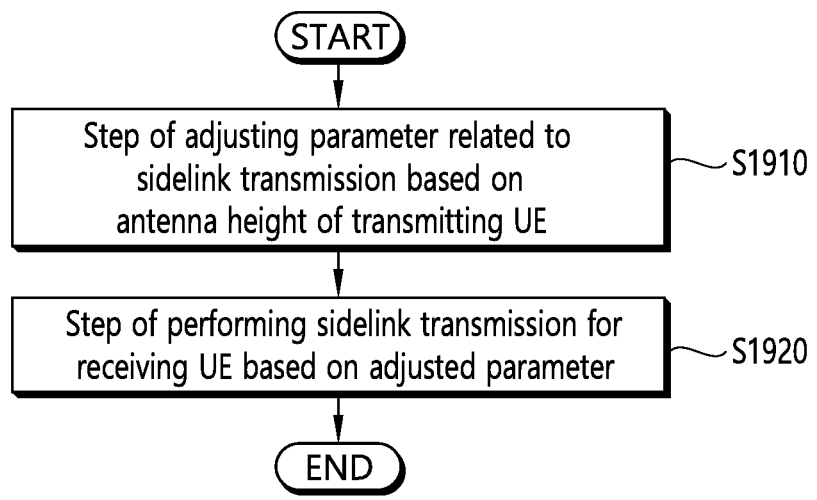
FIG. 19 shows a method for performing, by a transmitting UE, sidelink transmission according to an exemplary embodiment of the present disclosure.

FIG. 19 shows a method for performing, by a transmitting UE, sidelink transmission according to an exemplary embodiment of the present disclosure.

Referring to FIG. 19, in step S1910, a transmitting UE may adjust parameters related to sidelink transmission based on an antenna height of the transmitting UE. For example, the antenna height may be a physical antenna height. Alternatively, for example, the antenna height may be determined in accordance with a physical antenna height and the UE type of the transmitting UE. Alternatively, for example, the antenna height may be determined in accordance with the UE type of the transmitting UE.

For example, the parameter may be a transmission power for sidelink transmission. In this case, if the antenna height of the transmitting UE is high, the transmission power for the sidelink transmission may be adjusted to a small value.

For example, the parameter may be a Modulation and Coding Scheme (MCS) for sidelink transmission. In this case, if the antenna height of the transmitting UE is high, the MCS may be adjusted to a large value.

For example, the parameter may be a threshold value being used in a sensing operation for sidelink resource selection. If a Reference Signal Received Power (RSRP) of a Physical Sidelink Shared Channel (PSSCH), which is measured by the transmitting UE, exceeds the threshold value, a resource related to the PSSCH may be excluded from a resource selection candidate group. In this case, if the antenna height of the transmitting UE is low, the threshold value may be adjusted to a small value.

For example, the parameter may be a range for a horizontal angle or vertical angle of an antenna for sidelink transmission. In this case, if the antenna height of the transmitting UE is low, the horizontal angle or vertical angle of the antenna may be adjusted to a narrow range.

In step S1920, the transmitting UE may perform sidelink transmission for the receiving UE based on the adjusted parameter.

Additionally, the transmitting UE may receive information on a parameter related to the antenna height of the transmitting UE from a base station. Alternatively, the transmitting UE may receive information on a parameter related to the antenna height of the transmitting UE from another UE. The transmitting UE may perform communication with at least one of a mobile UE, a network, or autonomous (or self-driving) vehicles other than the transmitting UE.

The proposed method may be applied to the apparatus that will hereinafter be described in detail. For example, a wireless device (9010) of FIG. 21 may be a transmitting UE, and a wireless device (9020) may be a receiving UE. The transmitting UE may include at least one or more processors, such as processor (9011), at least one or more memories, such as memory (9012), and at least one or more transceivers, such as transceiver (9013). Additionally, the receiving UE may include at least one or more processors, such as processor (9021), at least one or more memories, such as memory (9022), and at least one or more transceivers, such as transceiver (9023).

Firstly, the processor (9011) of the transmitting UE may adjust a parameter related to sidelink transmission based on an antenna height of the transmitting UE. And, the processor (9011) of the transmitting UE may control the transceiver (9013) of the transmitting UE so that the transceiver (9013) can perform sidelink transmission for a receiving UE based on the adjusted parameter. Additionally, the processor (9011) of the transmitting UE may control the transceiver (9013) of the transmitting UE so that the transceiver (9013) can receive information on the parameter related to the antenna height of the transmitting UE from a base station. Alternatively, the processor (9011) of the transmitting UE may control the transceiver (9013) of the transmitting UE so that the transceiver (9013) can receive information on the parameter related to the antenna height of the transmitting UE from another UE.

Figure 20:
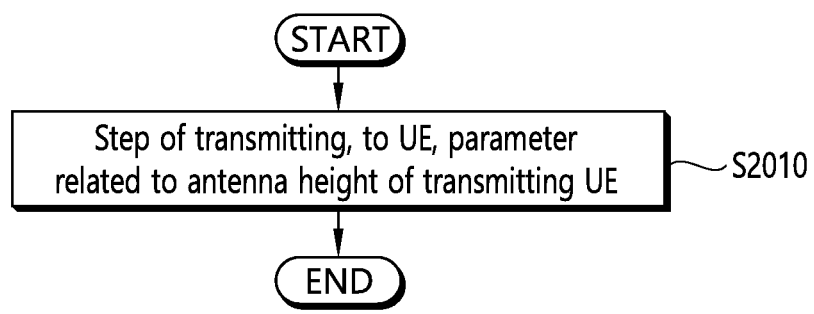
FIG. 20 shows a method for transmitting, by a base station, a parameter related to an antenna height of a UE according to an exemplary embodiment of the present disclosure.

FIG. 20 shows a method for transmitting, by a base station, a parameter related to an antenna height of a UE according to an exemplary embodiment of the present disclosure.

Referring to FIG. 20, in step S2010, a base station may transmit a parameter related to an antenna height of the UE to the UE. For example, the parameter may be at least one of a transmission power for sidelink transmission, a Modulation and Coding Scheme (MCS) for sidelink transmission, a threshold value being used during a sensing operation for sidelink resource selection, or a range for a horizontal angle or vertical angle of an antenna for sidelink transmission.

The proposed method may be applied to the apparatus that will hereinafter be described in detail. For example, a wireless device (9010) of FIG. 21 may be a base station, and a wireless device (9020) may be a UE. The base station may include at least one or more processors, such as processor (9011), at least one or more memories, such as memory (9012), and at least one or more transceivers, such as transceiver (9013). Additionally, the UE may include at least one or more processors, such as processor (9021), at least one or more memories, such as memory (9022), and at least one or more transceivers, such as transceiver (9023).

Firstly, the processor (9011) of the base station may control the transceiver (9013) of the base station so that the transceiver (9013) can transmit the parameter related to the antenna height of a UE to the UE. For example, the parameter(s) may be at least one of a transmission power for sidelink transmission, a Modulation and Coding Scheme (MCS) for sidelink transmission, a threshold value being used during a sensing operation for sidelink resource selection, or a range for a horizontal angle or vertical angle of an antenna for sidelink transmission.

Although the proposed methods may be independently implemented, a combination (or integration) of part of the proposed methods may also be implemented. Information on an application or non-application of the proposed methods (or information of rules of the proposed methods) may be notified to the UE by the base station, or to the receiving UE by the transmitting UE, via pre-defined signaling (e.g., physical layer signaling or higher layer signaling).

Hereinafter, an apparatus to which the present disclosure can be applied will be described in detail.

Figure 21:
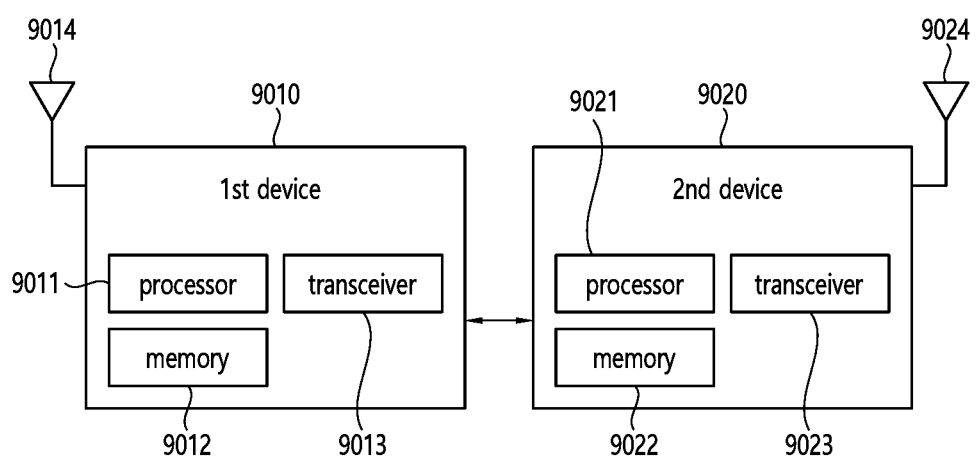
FIG. 21 shows a wireless communication apparatus according to an embodiment of the present disclosure.

FIG. 21 shows a wireless communication apparatus according to an embodiment of the present disclosure.

Referring to FIG. 21, a wireless communication system may include a first apparatus (9010) and a second apparatus (9020).

The first apparatus (9010) may be a base station, a network node, a transmitting terminal, a receiving terminal, a wireless device, a wireless communication device, a vehicle, a vehicle equipped with an autonomous driving function, a connected car, a unmanned aerial vehicle (UAV), an artificial intelligence (AI) module, a robot, an augmented reality (AR) device, a virtual reality (VR) device, a mixed reality (MR) device, a hologram device, a public safety device, a machine type communication (MTC) device, an internet of things (IoT) device, a medical device, a pin-tech device (or financial device), a security device, a climate/environmental device, devices related to 5G services, or other devices related to fourth industrial revolution fields.

The second apparatus (9020) may be a base station, a network node, a transmitting terminal, a receiving terminal, a wireless device, a wireless communication device, a vehicle, a vehicle equipped with an autonomous driving function, a connected car, a unmanned aerial vehicle (UAV), an artificial intelligence (AI) module, a robot, an augmented reality (AR) device, a virtual reality (VR) device, a mixed reality (MR) device, a hologram device, a public safety device, a machine type communication (MTC) device, an internet of things (IoT) device, a medical device, a pin-tech device (or financial device), a security device, a climate/environmental device, devices related to 5G services, or other devices related to fourth industrial revolution fields.

For example, the terminal may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tech device may be a device capable of providing financial services such as mobile payment. For example, the pin-tech device may include a payment device or a point of sales (POS). For example, the climate/environmental device may include a device for monitoring or predicting a climate/environment.

The first apparatus (9010) may include at least one processor, such as a processor (9011), at least one memory, such as a memory (9012), and at least one transceiver, such as a transceiver (9013). The processor (9011) may perform the functions, procedures, and/or methods described above. The processor (9011) may perform one or more protocols. The processor (9011) may perform one or more layers of a radio interface protocol. The memory (9012) may be connected to the processor (9011) and store various types of information and/or commands. The transceiver (9013) may be connected to the processor (9011) and controlled to transmit/receive a radio signal. The transceiver (9013) may be connected to one or more of the antennas (9014-1 to 9014-$n$). In the present specification, the n antennas may be the number of physical antennas or the number of logical antenna ports.

The second apparatus (9020) may include at least one processor, such as a processor (9021), at least one memory, such as a memory (9022), and at least one transceiver, such as a transceiver (9023). The processor (9021) may perform the functions, procedures, and/or methods described above. The processor (9021) may implement one or more protocols. For example, the processor (9021) may implement one or more layers of the radio interface protocol. The memory (9022) may be connected to the processor (9021) and store various types of information and/or commands. The transceiver (9023) may be connected to the processor (9021) and controlled to transmit/receive a radio signal. The transceiver (9023) may be connected to one or more of the antennas (9024-1 to 9024-$n$).

The memory (9012) and/or the memory (9022) may be each connected inside or outside the processor (9011) and/or the processor (9021) and connected to other processors through various techniques such as wired or wireless connection.

The first apparatus (9010) and/or the second apparatus (9020) may have one or more antennas. For example, antenna (9014) and/or antenna (9024) may be configured to transmit/receive radio signals.

Figure 22:
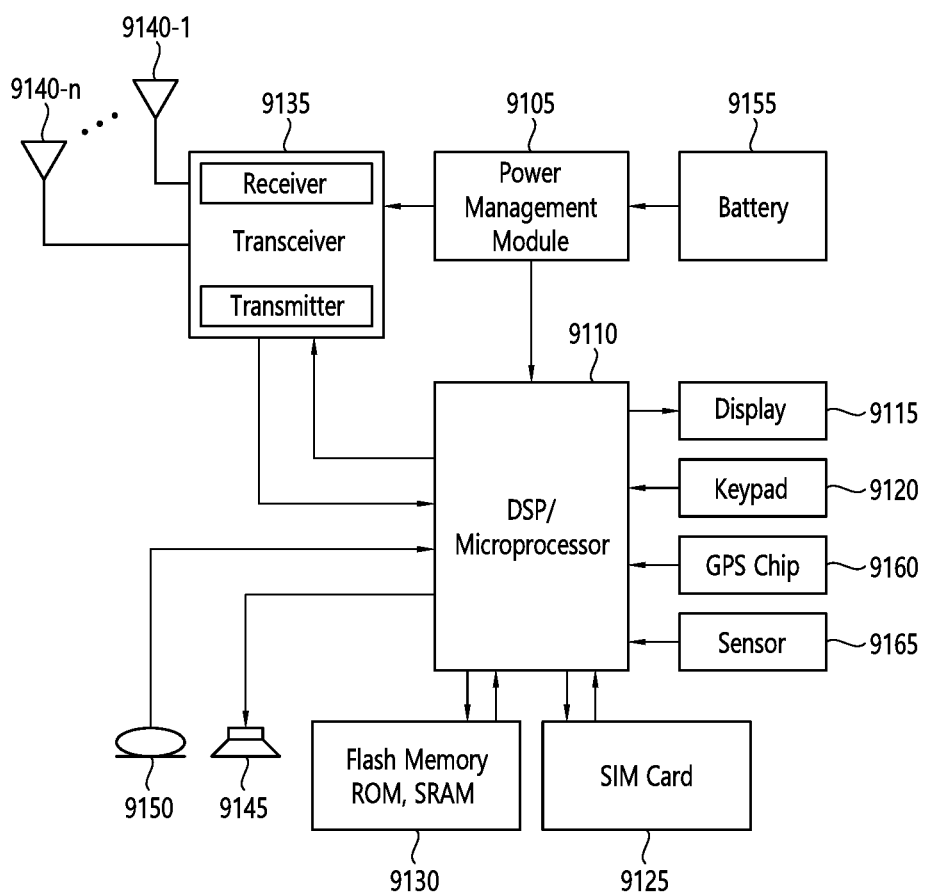
FIG. 22 shows a wireless communication device according to an exemplary embodiment of the present disclosure.

FIG. 22 shows a wireless communication device according to an exemplary embodiment of the present disclosure.

FIG. 22 may represent a more detailed diagram of a first apparatus or second apparatus (9010, 9020) shown in FIG. 21. However, the wireless communication device of FIG. 22 is not limited to the user equipment (UE). The wireless communication device may be a random appropriate mobile computer device being configured to perform one or more embodiments of the present disclosure, such as a vehicle communication system or device, a wearable device, a portable computer, a smartphone, and so on.

Referring to FIG. 22, the user equipment (UE) may include at least one or more processors (e.g., DSP or microprocessor), such as a processor (9110), a transceiver (9135), a power management module (9105), an antenna (9140), a battery (9155), a display (9115), a keypad (9120), a Global Positioning System (GPS) chip (9160), a sensor (9165), a memory (9130), (optionally) a subscriber identification module (SIM) card (9125), a speaker (9145), a microphone (9150), and so on. The user equipment may include one or more antennas.

The processor (9110) may be configured to perform the above-described functions, procedures, and/or methods of the present disclosure. According to an exemplary embodiment of the present disclosure, the processor (9110) may perform one or more protocols, such as layers of a radio interface protocol.

The memory (9130) is connected to the processor (9110) and may store information related to the operation of the processor (9110). The memory (9130) may be located inside or outside of the processor (9110), and the memory (9130) may also be connected to another processor via various technologies, such as wired or wireless connection.

A user may input various types of information (e.g., command information, such as phone numbers) by using various techniques, such as pushing a button of the keypad (9120) or voice activation using the microphone (9150). The processor (9110) may receive and process user information and may execute proper functions, such as making a phone call by dialing a phone number. For example, data (e.g., operation data) may be searched from the SIM card (9125) or the memory (9130) in order to execute the respective functions. As another example, the processor (9110) may receive and process GPS information from the GPS chip (9160) in order to execute functions related to the position of the UE, such as vehicle navigation, map service, and so on. As another example, the processor (9110) may indicate various types of information and data to the display (9115) for referential usage or convenience of the user.

The transceiver (9135) may be connected to the processor (9110) may transmit/receive radio signals, such as RF signals. The processor (9110) may control the transceiver (9135) so that the transceiver (9135) can initiate communication and transmit radio signals including various types of information or data, such as voice communication data. The transceiver (9135) may include a receiver and a transmitter in order to transmit or receive radio signals. The antenna (9140) may easily perform transmission/reception of radio signals. According to the exemplary embodiment, when receiving radio signals, the transceiver (9135) may forward and convert the signals to a baseband frequency in order to process the signals by using the processor (9110). The processed signals may be processed in accordance with various technologies, such as converting the processed signals to information that can be heard by being outputted through the speaker (9145) or information that can be read.

According to the exemplary embodiment of the present disclosure, the sensor (9165) may be connected to the processor (9110). The sensor (9165) may include at least one detection device being configured to discover various forms of information including speed, acceleration, light, oscillation, proximity, position, image, and so on, but not being limited only to the information types listed above. The processor (9110) may receive and process sensor information acquired from the sensor (9165) and may execute various types of functions, such as collision prevention, automatic driving, and so on.

In the example of FIG. 22, various components (e.g., camera, USB port, and so on) may be further included in the UE. For example, a camera may be connected to the processor (9110) and may be used for various services, such as automatic driving, vehicle safety service, and so on.

As described above, FIG. 22 is merely an example of the user equipment (UE), and, therefore, the embodiment of the same will not be limited only to this. For example, some of the components (e.g., keypad (9120), GPS chip (9160), sensor (9165), speaker (9145), and/or microphone (9150)) may not be implemented in some scenarios.

Figure 23:
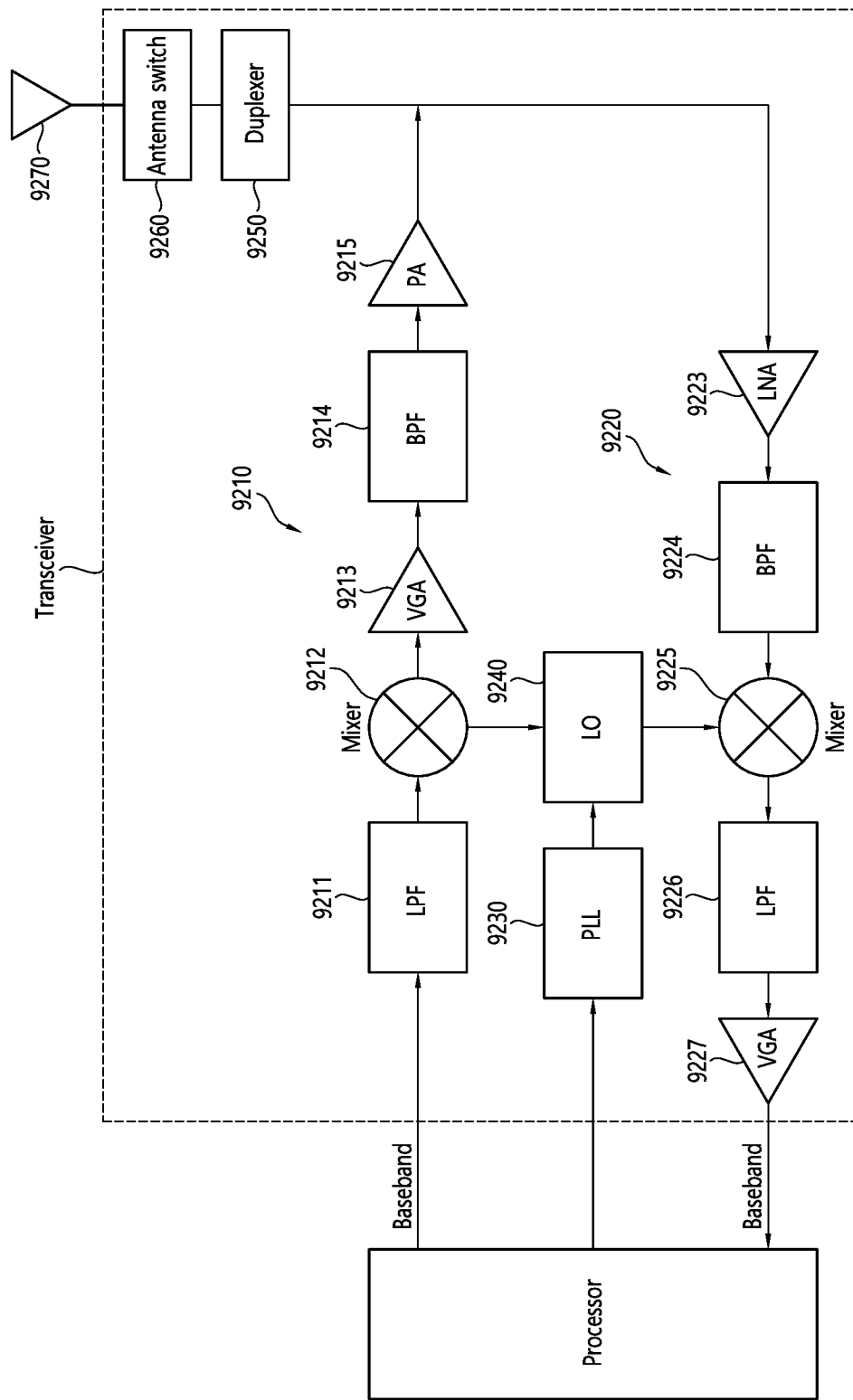
FIG. 23 shows a transceiver of a wireless communication device according to an exemplary embodiment of the present disclosure.

FIG. 23 shows a transceiver of a wireless communication device according to an exemplary embodiment of the present disclosure. For example, FIG. 23 may illustrate an example of a transceiver that can be implemented in a frequency division duplex (FDD) system.

In a transmission path, just as the processor described in FIG. 21 and FIG. 22, at least one processor may process data so that the data can be transmitted, and the at least one processor may send (or transmit) signals, such as analog output signals to a transmitter (9210).

In this example, in the transmitter (9210), an analog output signal may be filtered by a low pass filter (LPF) (9211) in order to, for example, eliminate (or remove) noise caused by a previous digital-to-analog conversion (ADC). Herein, the analog output signal may also be up-converted from a baseband to a radio frequency (RF) by an up-converter (e.g., mixer) (9212) and may also be amplified by an amplifier, such as a variable gain amplifier (VGA) (9213). The amplified signal may be filtered by a filter (9214), amplified by a power amplifier (PA) (9215), routed by a duplexer (9250)/antenna switches (9260), and transmitted through an antenna (9270).

In a reception path, the antenna (9270) may receive signals in a wireless environment, and the received signals may be routed by antenna switches (9260)/duplexer (9250), and the routed signals may then be delivered to a receiver (9220).

In this example, a signal that is received by the receiver (9220) may be amplified by an amplifier, such as a low noise amplifier (LNA) (9223), filtered by a band pass filter (9224), and down-converted from an RF to a baseband by a down-converter (e.g., mixer) (9225).

The down-converted signal may be filtered by a low pass filter (LPF) (9226), amplified by an amplifier, such as a VGA (9227) in order to obtain an analog input signal, and the analog input signal may be provided to one or more processors.

Furthermore, a local oscillator (LO) (9240) may generate transmission/reception of LO signals, which are then respectively transmitted to the up-converter (9212) and the down-converter (9225).

According to the exemplary embodiment, a phase locked loop (PLL) (9230) may receive control information from the processor, and, in order to generate transmission and reception of the LO signals in a proper frequency, the PLL (9230) may transmit control signals to the LO generator (9240).

The implementations will not be limited to the specific alignment shown in FIG. 23. And, therefore, it shall be understood that various components and circuits may also be aligned differently from the example shown in FIG. 23.

Figure 24:
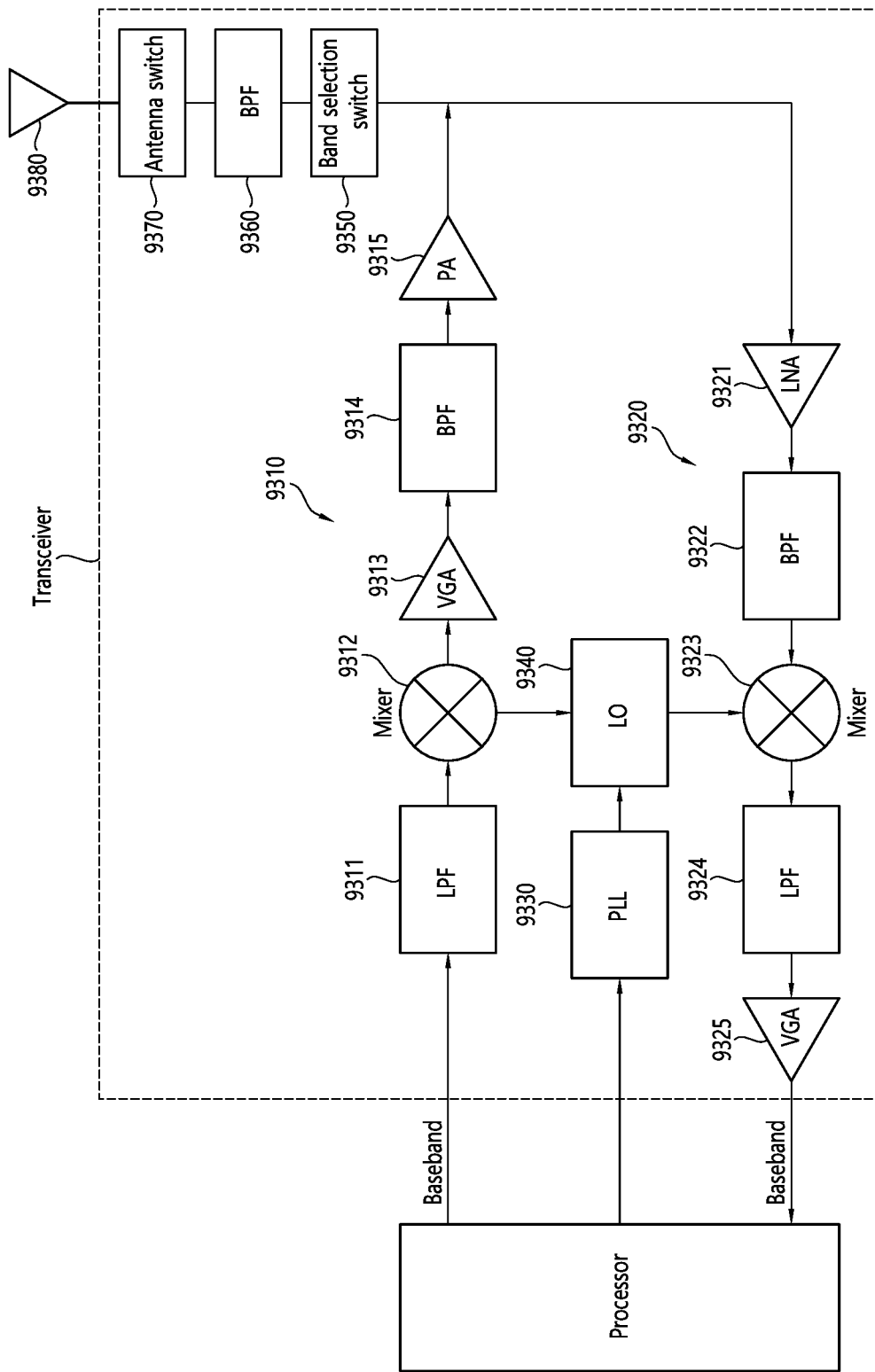
FIG. 24 shows a transceiver of a wireless communication device according to an exemplary embodiment of the present disclosure.

FIG. 24 shows a transceiver of a wireless communication device according to an exemplary embodiment of the present disclosure. For example, FIG. 24 may illustrate an example of a transceiver that can be implemented in a time division duplex (TDD) communication system.

According to the exemplary embodiment, a transmitter (9310) and a receiver (9320) of a transceiver in the TDD system may have one or more similar characteristics as the transmitter and receiver of the transceiver in the FDD system. Hereinafter, a structure of the transceiver of the TDD system will be described in detail.

In a transmission path, signals that are amplified by a power amplifier (PA) (9315) of the transmitter may be routed by a band selection switch (9350), a band pass filter (BPF) (9360), and antenna switch(es) (9370), and the routed signals may then be transmitted to the antenna (9380).

In a reception path, the antenna (9380) may receive signals from a wireless environment, and, then, the received signals may be routed by the antenna switch(es) (9370), the band pass filter (BPF) (9360), and the band selection switch (9350), and the routed signals may then be provided to the receiver (9320).

Figure 25:
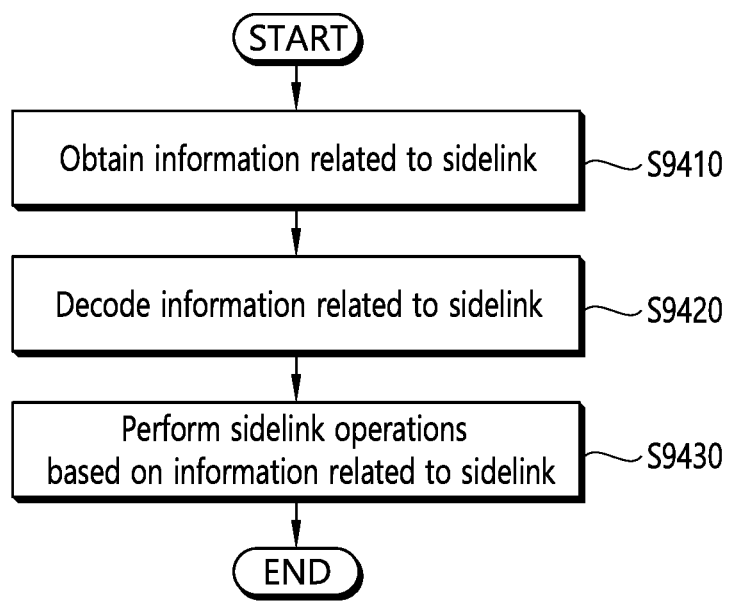
FIG. 25 shows operations of a wireless device being related to sidelink communication according to an embodiment of the present disclosure.

FIG. 25 shows operations of a wireless device being related to sidelink communication according to an embodiment of the present disclosure. The operations of the wireless device related to sidelink, which are described in FIG. 25, are merely exemplary, and sidelink operations using various technologies may be performed by the wireless device. Sidelink is a UE-to-UE interface for sidelink communication and/or sidelink discovery. Sidelink may correspond to a PC5 interface. In a broader meaning, sidelink operations may be the transmission/reception of information between UEs. Sidelink may deliver (or transport) various forms of information.

Referring to FIG. 25, in step S9410, the wireless device may obtain information related to sidelink. The information related to sidelink may be obtained from another wireless device or from a network node.

After obtaining the information, in step S9420, the wireless device may decode the information related to sidelink.

After decoding the information related to sidelink, in step S9430, the wireless device may perform one or more sidelink operations based on the information related to sidelink. Herein, the sidelink operation(s) performed by the wireless device may be one or more of the operations described in this specification.

Figure 26:
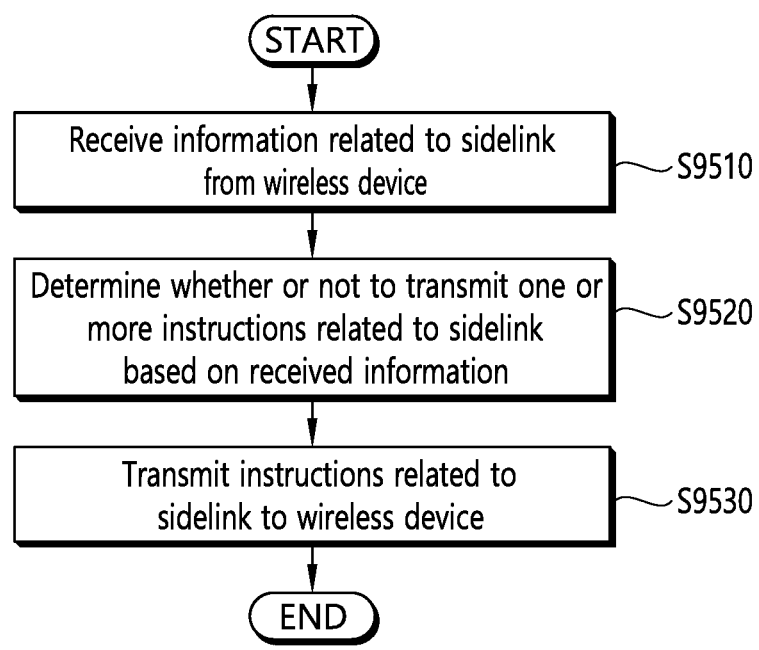
FIG. 26 shows operations of a network node being related to sidelink communication according to an embodiment of the present disclosure.

FIG. 26 shows operations of a network node being related to sidelink communication according to an embodiment of the present disclosure. Network node operations related to sidelink, which are described in FIG. 26, are merely exemplary, and sidelink operations using various technologies may be performed by the network node.

Referring to FIG. 26, in step S9510, the network node may receive information related to sidelink from a wireless device. For example, the information related to sidelink may be 'SidelinkUEInformation', which is used for notifying (or informing) the sidelink information to the network node.

After receiving the information, in step S9520, the network node may determine whether or not to transmit one or more instructions related to sidelink based on the received information.

According to the determined result of the network node for transmitting instructions, in step S9530, the network node may transmit instruction(s) related to sidelink to the wireless device. According to the implementation example, after receiving the instructions transmitted from the network node, the wireless device may perform one or more sidelink operation(s) based on the received instruction(s) (or command(s)).

Figure 27:
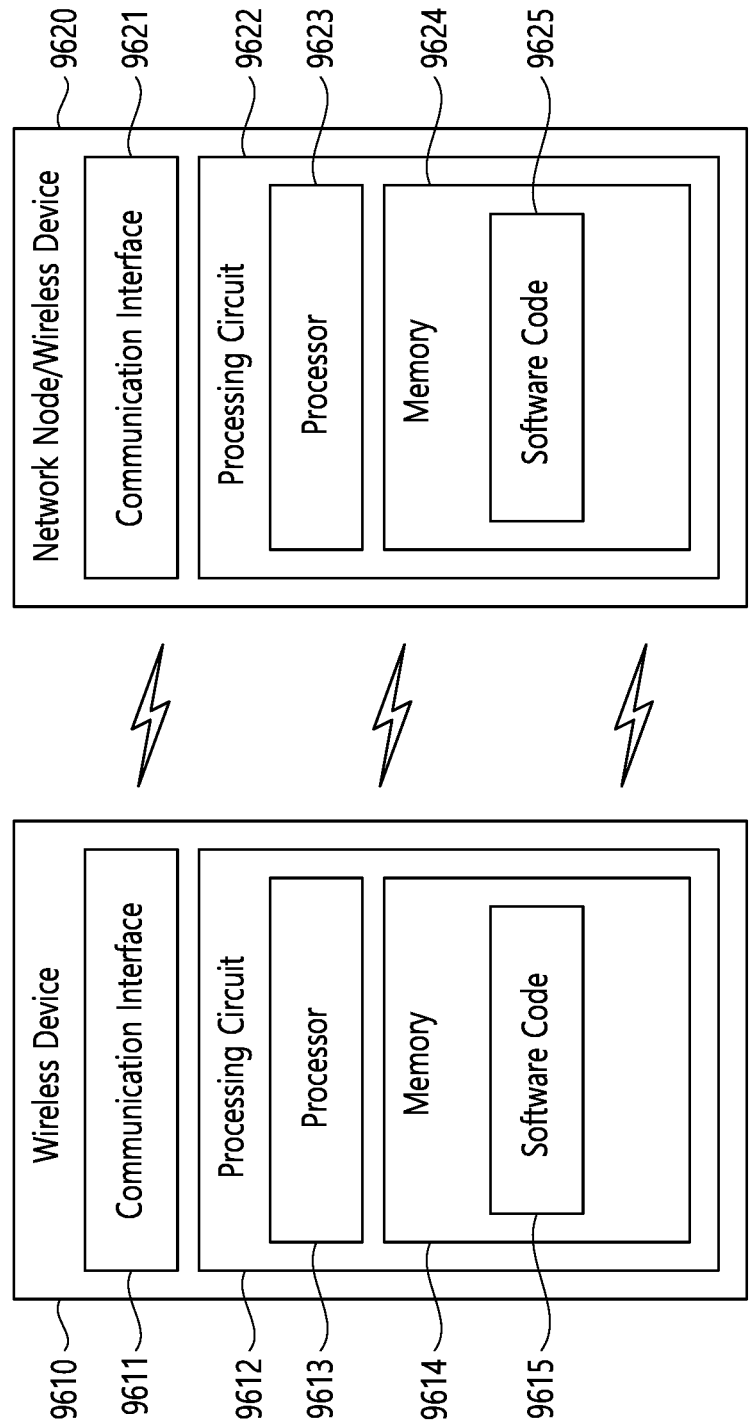
FIG. 27 shows an embodiment of a wireless device and a network node according to an exemplary embodiment of the present disclosure.

FIG. 27 shows an embodiment of a wireless device and a network node according to an exemplary embodiment of the present disclosure. The network node may be replaced with a wireless device or a user equipment (UE) (or terminal).

Referring to FIG. 27, a wireless device (9610) may include a communication interface (9611) for communicating with one or more other wireless devices, network nodes and/or other elements (or components) within the network. The communication interface (9611) may include one or more transmitters, one or more receivers, and/or one or more communication interfaces. The wireless device (9610) may include a processing circuit (9612). The processing circuit (9612) may include one or more processors, such as a processor (9613), and one or more memories, such as a memory (9614).

The processing circuit (9612) may be configured to control random methods and/or processes that are described in this specification and/or to allow, for example, the wireless device (9610) to perform such methods and/or processes. The processor (9613) may correspond to one or more processor for performing the wireless device functions that are described in this specification. The wireless device (9610) may include a memory (9614) being configured to store data, program software codes and/or other information, which are described in this specification.

According to the exemplary embodiment, the memory (9614) may be configured to store software codes (9615) including commands allowing the processor (9613) to execute part or all of the above-described processes according to the present disclosure.

For example, just as the processor (9613), one or more processors controlling one or more transceivers, such as a transceiver (2223), for transmitting/receiving information may execute one or more processes related to the transmission/reception of information.

A network node (9620) may include a communication interface (9621) for communicating with one or more other network nodes, wireless devices and/or other elements (or components) within the network. Herein, the communication interface (9621) may include one or more transmitters, one or more receivers, and/or one or more communication interfaces. The network node (9620) may include a processing circuit (9622). Herein, the processing circuit may include a processor (9623) and a memory (9624).

According to the exemplary embodiment, the memory (9624) may be configured to store software codes (9625) including commands allowing the processor (9623) to execute part or all of the above-described processes according to the present disclosure.

For example, just as the processor (9623), one or more processors controlling one or more transceivers, such as a transceiver (2213), for transmitting/receiving information may execute one or more processes related to the transmission/reception of information.

The above-described exemplary embodiments may be configured by combining structural (or architectural) elements and characteristics of the present disclosure using various methods. And, unless specified otherwise, each structural element or function may be optionally considered. Each of the structural elements or characteristics may be executed (or performed) without being combined with other structural elements or characteristics. Additionally, part of the structural elements and/or characteristics may be combined with one another in order to configured the exemplary embodiments of the present disclosure. The operation order that is described in the exemplary embodiment of the present disclosure may be changed (or varied). Part of the structural elements or characteristics of one embodiment may be included in another embodiment or may be replaced with structural elements or characteristics corresponding to another embodiment.

The embodiments of the present disclosure may be configured by various technologies, e.g., the embodiments may be configured as hardware, firmware, software, or a combination of at least two or more of the same. In a hardware configuration, the method according to the embodiment of the present disclosure may be implemented by one or more application specific integrated circuits (ASICs), one or more digital signal processors (DSPs), one or more digital signal processing devices (DSPDs), one or more programmable logic devices (PLDs), one or more field programmable gate arrays (FPGAs), one or more processors, one or more controllers, one or more micro-controllers, one or more micro-processors, and so on.

In a firmware or software configuration, the embodiments of the present disclosure may be implemented in forms of modules, procedures, functions, and so on. A software code may be stored in a memory and may be executed by a processor. The memory may be located inside or outside of the processor and may transmit/receive data to and from the processor by using diverse methods.

It will be apparent that anyone skilled in the art is capable of carrying out diverse changes and variations that can be made in the present disclosure without departing from the technical scope and spirit of the present disclosure. The present disclosure is described while referring to an example of applying the present disclosure to a 3GPP LTE/LTE-A system or a 5G system (or NR system), the present disclosure may also be applied to other diverse wireless communication systems.

What is claimed is:

1. A method for performing, by a transmitting user equipment (UE), sidelink transmission in a wireless communication system, the method comprising:
   receiving, from a base station, information on a transmission parameter related to an antenna height of the transmitting UE within a zone;
   determining a first transmission parameter related to the sidelink transmission;
   adjusting the first transmission parameter to a second transmission parameter related to the sidelink transmission within the zone, based on (i) the antenna height of the transmitting UE within the zone and (ii) the information on the transmission parameter related to the antenna height of the transmitting UE within the zone; and
   performing the sidelink transmission for a receiving UE based on the second transmission parameter.

2. The method of claim 1, wherein the antenna height is a physical antenna height.

3. The method of claim 1, wherein the antenna height is determined based on a physical antenna height and a UE type of the transmitting UE.

4. The method of claim 1, wherein the first transmission parameter and the second transmission parameter are transmission power for sidelink transmission.

5. The method of claim 4, wherein, based on the antenna height of the transmitting UE being higher than a predetermined first height, the transmission power for sidelink transmission is adjusted to a smaller value based on the antenna height of the transmitting UE.

6. The method of claim 1, wherein the first transmission parameter and the second transmission parameter are a Modulation and Coding Scheme (MCS) for sidelink transmission.

7. The method of claim 6, wherein, based on the antenna height of the transmitting UE being higher than a predetermined second height, the MCS is adjusted to a larger value based on the antenna height of the transmitting UE.

8. The method of claim 1,
   wherein the first transmission parameter and the second transmission parameter are a threshold value in a sensing operation for sidelink resource selection, and
   wherein, based on a Reference Signal Received Power (RSRP) of a Physical Sidelink Shared Channel (PSSCH), the RSRP being measured by the transmitting UE, exceeding the threshold value, a resource related to the PSSCH is excluded from a resource selection candidate group.

9. The method of claim 8, wherein, based on the antenna height of the transmitting UE being lower than a predetermined third height, the threshold value is adjusted to a smaller value based on the antenna height of the transmitting UE.

10. The method of claim 1, wherein the first transmission parameter and the second transmission parameter are a range for a horizontal angle or vertical angle of an antenna for sidelink transmission.

11. The method of claim 10, wherein, based on the antenna height of the transmitting UE being lower than a predetermined third height, the threshold value is adjusted to a smaller value based on the antenna height of the transmitting UE.

12. The method of claim 1, wherein the transmitting UE performs communication with at least one of a mobile UE, a network, or autonomous vehicles other than the transmitting UE.

13. An apparatus configured to control a transmitting user equipment (UE), the apparatus comprising: one or more processors; and one or more memories operably connectable to the one or more processors and storing instructions, wherein the one or more processors execute the instructions to:
  receive, from a base station, information on a transmission parameter related to an antenna height of the transmitting UE within a zone;
  determine a first transmission parameter related to the sidelink transmission;
  adjust the first transmission parameter to a second transmission parameter related to the sidelink transmission within the zone, based on (i) the antenna height of the transmitting UE within the zone and (ii) the information on the transmission parameter related to the antenna height of the transmitting UE within the zone; and
  perform the sidelink transmission for a receiving UE based on the second parameter.

14. A first apparatus for performing wireless communication, the first apparatus comprising:
  one or more memories storing instructions;
  one or more transceivers; and
  one or more processors operably connected to the one or more memories and the one or more transceivers, wherein the one or more processors execute the instructions to:
  receive, from a base station, information on a transmission parameter related to an antenna height of the first apparatus within a zone;
  determine a first transmission parameter related to the sidelink transmission;
  adjust the first transmission parameter to a second transmission parameter related to the sidelink transmission within the zone, based on (i) the antenna height of the first apparatus within the zone and (ii) the information on the transmission parameter related to the antenna height of the first apparatus within the zone; and
  perform the sidelink transmission for a receiving UE based on the second parameter.

* * * * *